US012645727B2

(12) United States Patent (10) Patent No.: US 12,645,727 B2
Mahabal et al. (45) Date of Patent: Jun. 2, 2026

(54) DETERMINING TOPICS FOR TAXONOMIES

(71) Applicant: Pinterest, Inc., San Francisco, CA (US)

(72) Inventors: Abhijit Mahabal, Cupertino, CA (US);
Rui Huang, Cupertino, CA (US)

(73) Assignee: Pinterest, Inc., San Francisco, CA (US)

( * ) Notice: Subject to any disclaimer, the term of this
patent is extended or adjusted under 35
U.S.C. 154(b) by 0 days.

(21) Appl. No.: 18/733,690

(22) Filed: Jun. 4, 2024

(65) Prior Publication Data

US 2024/0320254 A1 Sep. 26, 2024

Related U.S. Application Data

(63) Continuation of application No. 17/844,640, filed on
Jun. 20, 2022, now Pat. No. 12,038,961.

(51) Int. Cl.
G06F 16/353 (2025.01)
G06F 16/3332 (2025.01)
G06F 16/36 (2019.01)
G06F 40/284 (2020.01)

(52) U.S. Cl.
CPC ........ G06F 16/353 (2019.01); G06F 16/3334
(2019.01); G06F 16/367 (2019.01); G06F
40/284 (2020.01)

(58) Field of Classification Search
CPC .. G06F 16/353; G06F 16/367; G06F 16/3334;
G06F 40/284
See application file for complete search history.

(56) References Cited

U.S. PATENT DOCUMENTS

| | | | |
|---|---|---|---|
| 9,697,276 B2 | 7/2017 | Aleksandrowicz et al. | |
| 9,990,432 B1 * | 6/2018 | Lai | G06F 16/9535 |
| 10,402,408 B2 | 9/2019 | Standefer et al. | |
| 2004/0024739 A1 | 2/2004 | Copperman et al. | |
| 2007/0185868 A1 * | 8/2007 | Roth | G06F 16/81 |
| 2008/0077570 A1 | 3/2008 | Tang et al. | |
| 2009/0070299 A1 | 3/2009 | Parikh et al. | |
| 2010/0070540 A1 | 3/2010 | Danial | |
| 2010/0114812 A1 * | 5/2010 | Williams | G06F 16/353 |
| | | | 706/54 |

(Continued)

OTHER PUBLICATIONS

Yahya et al., Exporatory Querying of Extended Knowledge Graphs,
(Year: 2016) (Year: 2016).*

(Continued)

*Primary Examiner* — Matthew J Ellis
(74) *Attorney, Agent, or Firm* — Gustafson IP

(57) ABSTRACT

Systems and methods for determining one or more topics
that may be associated and/or grounded with a node of a
taxonomy to facilitate the creation and/or modification of the
taxonomy. The one or more topics can be determined by
generating two layers of associations and/or groundings. In
a first layer, tokens can be associated and/or grounded in a
corpus of queries, and in a second layer, topics can be
associated and/or grounded in the tokens. The topics can
then be associated with and/or grounded in nodes of a
taxonomy which can facilitate access to content items stored
and maintained by an online service. Further, in exemplary
implementations where the content items include associa-
tions and/or mappings to the corpus of queries, the nodes of
the taxonomy (which are associated with one or more topics)
can be transitively mapped to the content items.

20 Claims, 19 Drawing Sheets

(56)                    References Cited

U.S. PATENT DOCUMENTS

| | | | | |
|---|---|---|---|---|
| 2013/0013644 A1* | 1/2013 | Sathish | G06F 16/9535 | 707/792 |
| 2016/0203130 A1* | 7/2016 | Roque | G06F 16/3344 | 707/741 |
| 2019/0108282 A1* | 4/2019 | Zeng | G06F 16/9535 | |
| 2022/0108071 A1 | 4/2022 | Tanaka et al. | | |
| 2022/0335538 A1 | 10/2022 | Park et al. | | |

OTHER PUBLICATIONS

Omid et al. "Discovery of Numerous Specific Topics Via Term Co-Occurrence Analysis", Mar. 24, 2011, pp. 3-30. (Year: 2011).*

Arora, S. et al. 2018. Linear Algebraic Structure of Word Senses, with applications to Polysemy. Transactions of the Association for Computational Linguistics 6 (2018), 483-495, URL: https://aclanthology.org/Q18-1034.pdf.

Barsalou, Lawrence W. 1985. Ideals, Central Tendency, and Frequency of Instantiation as Determinants of Graded Structure in Categories. Journal of Experimental Psychology: Learning, Memory, and Cognition 11, 4 (1985), 629-654, URL: http://matt.colorado.edu/teaching/categories/b85.pdf.

Biemann, Chris. 2006. Chinese Whispers—an Efficient Graph Clustering Algorithm and its Application to Natural Language Processing Problems. Proceedings of TextGraphs: the First Workshop on Graph Based Methods for Natural Language Processing (2006) Association for Computational Linguistics, 73-80, URL: https://aclanthology.org/W06-3812.pdf.

Clark, Andy. 1998. Magic Words: How Language Augments Human Computation. 162-183 pages, URL: https://era.ed.ac.uk/bitstream/1842/1311/1/magic.pdf.

Dennett, Daniel C. 1991. Consciousness Explained. Little Brown & Co. Whole book.

Harnad, Stevan. 1990. The Symbol Grounding Problem. Physica D: Nonlinear Phenomena 42, 1-3 (1990), 335-346, accessed Jun. 17, 2022, URL: https://arxiv.org/html/cs/9906002v1.

Hofstadter, Douglas R. 1995. Fluid Concepts and Creative Analogies: Computer Models of the Fundamental Mechanisms of Thought. Basic Books. Whole book.

Lakoff, George. 1987. Women, Fire, and Dangerous Things: What Categories Reveal about the Mind. University of Chicago Press, Chicago. Whole book.

Lee, D. et al. 2022. TaxoCom: Topic Taxonomy Completion with Hierarchical Discovery of Novel Topic Clusters. arXiv preprint arXiv:2201.06771 (2022), accessed Jun. 17, 2022, URL: https://arxiv.org/pdf/2201.06771.pdf, 11 pages.

Madani, Omid and Jiye Yu. 2010. Discovery of Numerous Specific Topics via Term Co-Occurrence Analysis. Proceedings of the 19th ACM International Conference on Information and Knowledge Management (2010), 33 pages.

Madani, Omid et al. "Discovery of Numerous Specific Topics Via Term Co-Occurrence Analysis", Mar. 24, 2011, pp. 3-30. (Year: 2011).

Mahabal, A. A. et al. 2018. Robust Handling of Polysemy via Sparse Representations. *SEM 2018: The Seventh Joint Conference on Lexical and Computational Semantics (2018) Association for Computational Linguistics, URL: https://aclanthology.org/S18-2031.pdf, 265-275.

Mahabal, A. et al. 2020. Improving Query Safety at Pinterest. arXiv (2020), 2006.11511v2, accessed Jun. 17, 2022, URL: https://arxiv.org/pdf/2006.11511.pdf, 14 pages.

Meng, Y. et al. 2020. Text Classification Using Label Names Only: A Language Model Self-Training Approach. arXiv (2020), 2010.07245v1, accessed Jun. 17, 2022, URL: https://arxiv.org/pdf/2010.07245.pdf, 12 pages.

Minsky, Marvin L. 1991. Logical Versus Analogical or Symbolic Versus Connectionist or Neat Versus Scruffy. AI Magazine 12, 2 (1991), 34-51, URL: https://www.aaai.org/ojs/index.php/aimagazine/article/view/894/812.

Panchenko, A. et al. 2017. Unsupervised, Knowledge-free, and Interpretable Word Sense Disambiguation. arXiv preprint arXiv:1707.06878 (2017), accessed Jun. 17, 2022, URL: https://arxiv.org/pdf/1707.06878.pdf, 6 pages.

Pustejovsky, James and Branimir Boguraev. Lexical Semantics: The Problem of Polysemy. (1996). Clarendon Press, Oxford. Whole book.

Rosch, Eleanor. 1975. Cognitive Representations of Semantic Categories. Journal of Experimental Psychology: General 104, 3 (1975), 192-233, URL: https://www.academia.edu/download/44806729/Cognitive_Representation_Semantic_Categories.PDF.

Shang, J. et al. 2020. NetTaxo: Automated Topic Taxonomy Construction from Text-Rich Network. Proceedings of The Web Conference (2020) 1908-1919. URL: https://dl.acm.org/doi/pdf/10.1145/3366423.3380259.

Simen, Patrick and Thad Polk. 2010. A symbolic/subsymbolic interface protocol for cognitive modeling. Log J IGPL 18, 5 (2010), 705-761, URL: https://www.ncbi.nlm.nih.gov/pmc/articles/PMC2919065/pdf/nihms-138848.pdf.

Thompson, R. K.R. et al. 1997. Language-Naive Chimpanzees (*Pan troglodytes*) Judge Relations Between Relations In A Conceptual Matching-To-Sample Task. Journal of Experimental Psychology: Animal Behavior Processes 23, 1 (1997), 31, URL: https://www.wellbeingintlstudiesrepository.org/cgi/viewcontent.cgi?article=1141&context=acwp_asie, 20 pages.

Yahya et al., Exploratory Querying of Extended Knowledge Graphs, 2016, pp. 1521-1524 (Year: 2016).

Yin, Xiaoxin and Sarthak Shah. 2010. Building Taxonomy of Web Search Intents for Name Entity Queries. Proceedings of the 19th International Conference on World Wide Web (2010), 1001-1010, URL: https://www.researchgate.net/publication/221023101_Building_taxonomy_of_web_search_intents_for_name_entity_queries.

Zhang, Y. et al. 2014. Taxonomy Discovery for Personalized Recommendation. Proceedings of the 7th ACM International Conference on Web Search and Data Mining (2014), 243-252, URL: https://dl.acm.org/doi/pdf/10.1145/2556195.2556236.

Ziegler, C-N et al. 2004. Taxonomy-driven Computation of Product Recommendations. Proceedings of the Thirteenth ACM International Conference on Information and Knowledge Management, 406-415, URL: http://www2.informatik.uni-freiburg.de/~cziegler/papers/CIKM-04-CR.pdf.

* cited by examiner

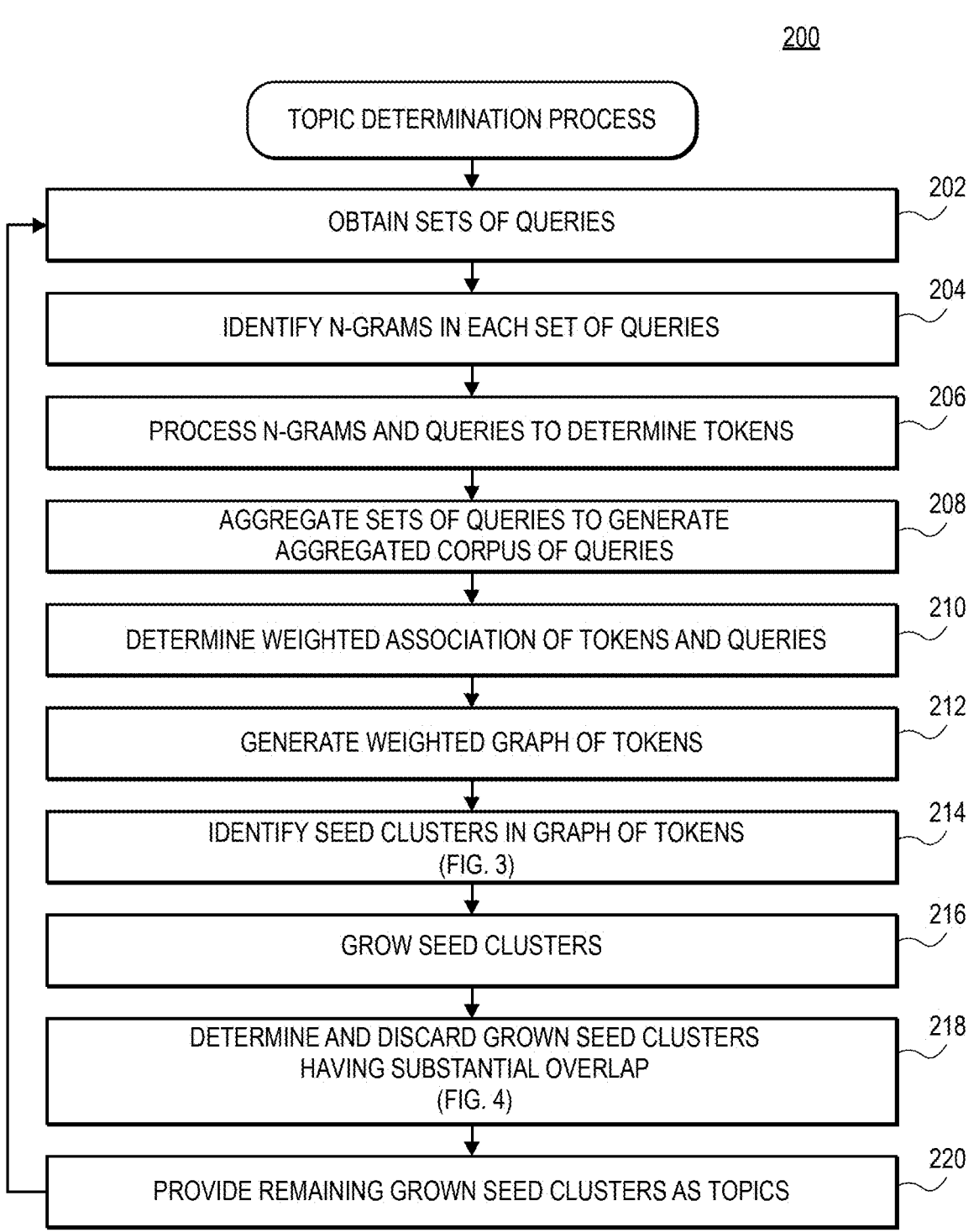

200

TOPIC DETERMINATION PROCESS

OBTAIN SETS OF QUERIES — 202

IDENTIFY N-GRAMS IN EACH SET OF QUERIES — 204

PROCESS N-GRAMS AND QUERIES TO DETERMINE TOKENS — 206

AGGREGATE SETS OF QUERIES TO GENERATE AGGREGATED CORPUS OF QUERIES — 208

DETERMINE WEIGHTED ASSOCIATION OF TOKENS AND QUERIES — 210

GENERATE WEIGHTED GRAPH OF TOKENS — 212

IDENTIFY SEED CLUSTERS IN GRAPH OF TOKENS (FIG. 3) — 214

GROW SEED CLUSTERS — 216

DETERMINE AND DISCARD GROWN SEED CLUSTERS HAVING SUBSTANTIAL OVERLAP (FIG. 4) — 218

PROVIDE REMAINING GROWN SEED CLUSTERS AS TOPICS — 220

SUB-TOPIC DETERMINATION
PROCESS

OBTAIN TOPIC ⁓ 502

OBTAIN QUERIES ASSOCIATED WITH
TOPICS ⁓ 504

GENERATE WEIGHTED GRAPH OF QUERIES
AND CONTENT ITEMS ⁓ 506

GENERATE WEIGHTED GRAPH OF QUERIES ⁓ 508

DETERMINE CLUSTERS OF QUERIES ⁓ 510

PROVIDE CLUSTERS OF QUERIES AS
SUB-TOPICS ⁓ 512

COMPLETE

DETERMINING TOPICS FOR TAXONOMIES

CROSS-REFERENCE TO PRIOR APPLICATIONS

This application is a continuation of and claims benefit to U.S. patent application Ser. No. 17/844,640, filed on Jun. 20, 2022 and entitled "Determining Topics for Taxonomies," which is hereby incorporated by reference herein in its entirety.

BACKGROUND

The amount of accessible content is ever expanding. For example, there are many online services that host and maintain content for their users and subscribers. Further, in connection with the hosting and maintenance of the accessible content, many online services may provide search, recommendation, personalization, and/or other services to facilitate access to the content. Often, online services will employ taxonomies created using machine learning models to define and associate content with the nodes of the taxonomies. However, creation and/or modification of taxonomies using traditional machine learning techniques can be difficult, expensive, and time-consuming. Further, complexities in language can lead to difficulties in text-based classifications, and image-based classifications can also include errors and overgeneralizations based on how the models are trained.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein:

FIG. 2 is a flow diagram of an exemplary topic determination process, according to exemplary embodiments of the present disclosure.

DETAILED DESCRIPTION

Figure 1:
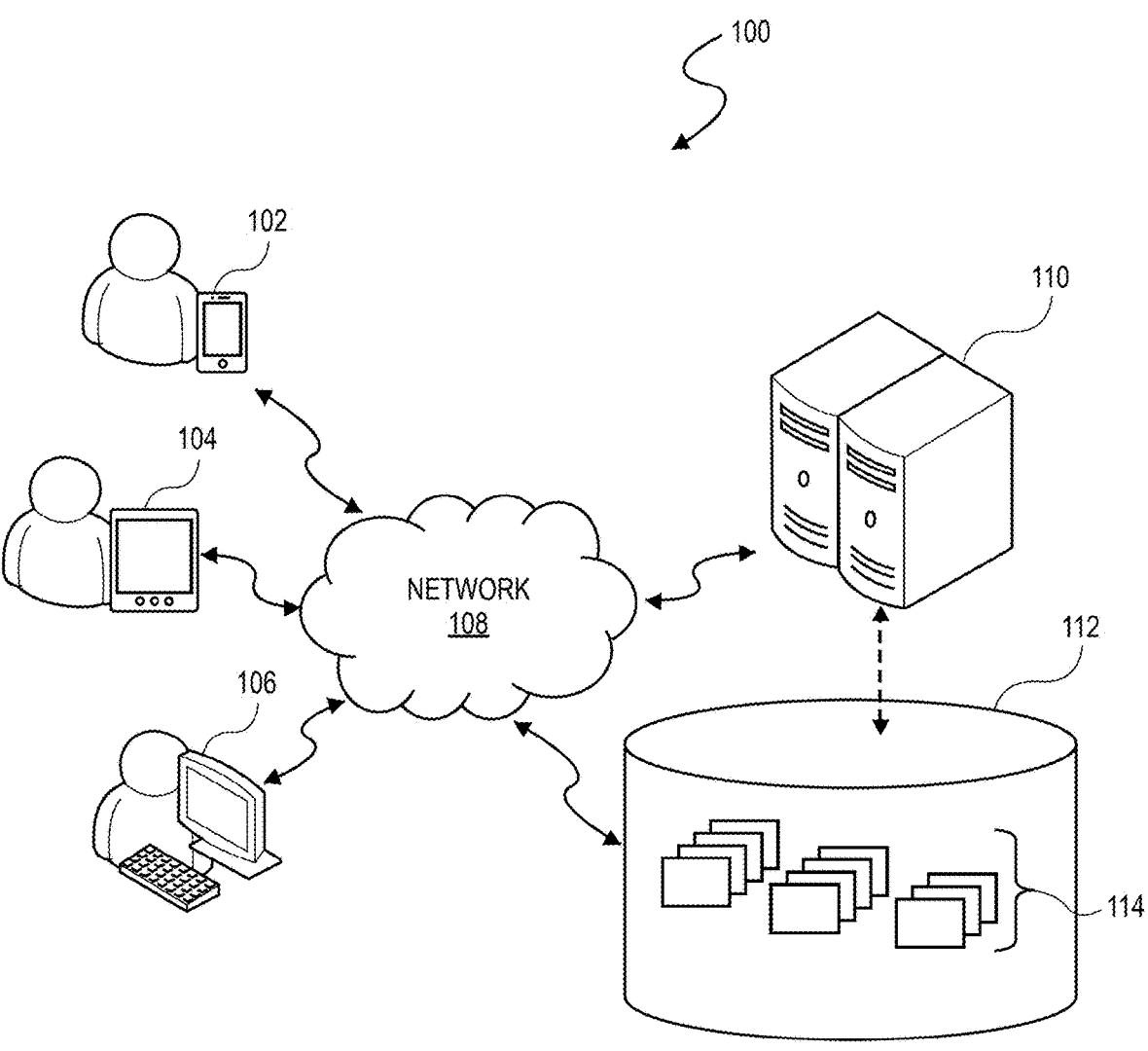
FIG. 1 is an illustration of an exemplary computing environment, according to exemplary embodiments of the present disclosure.

As in set forth in greater detail below, exemplary embodiments of the present disclosure are generally directed to systems and methods for determining one or more topics that may be associated and/or grounded with a node of a taxonomy to facilitate the creation and/or modification of the taxonomy. According to exemplary embodiments of the present disclosure, the determined topics can be determined by generating two layers of associations and/or groundings. In a first layer, tokens can be associated and/or grounded in a corpus of queries, and in a second layer, topics can be associated and/or grounded in the tokens. The topics can then be associated with and/or grounded in nodes of a taxonomy which can facilitate access to content items stored and maintained by an online service. Further, in exemplary implementations where the content items include associations and/or mappings to the corpus of queries, the nodes of the taxonomy (which are associated with one or more topics) can be transitively mapped to the content items.

According to exemplary embodiments of the present disclosure, one or more sets of queries from a corpus of queries can be processed and analyzed to determine one or more tokens presented in each set of queries. According to certain aspects of the present disclosure, the queries in each set of queries with which the tokens co-occur can be determined, and a query-token bi-graph can be generated to represent the association between the tokens and the queries in each set of queries.

The bi-graphs representing the associations between the tokens and the queries in each set of queries can then be aggregated across the corpus of queries to generate an aggregated query-token bi-graph. In aggregating the associations of tokens and queries across all tokens and queries across the corpus of queries, a weighted association can be determined for each respective association. The weighted association can represent a strength of the association between each respective token and query. Accordingly, the weighted associations can be used to generate the aggregated query-token bi-graph representing the associations between the tokens and queries across the corpus of queries.

Based on the aggregated query-token bi-graph, a similarity score can be determined for sets of tokens in the aggregated query-token bi-graph. Accordingly, a token graph can be generated based on the similarity scores determined for sets of tokens, where the similarity scores correspond to edge weights of the token graph. Within the token graph, one or more seed clusters may be identified. Each identified seed cluster may then be grown and/or expanded to include one or more additional tokens in the token graph to determine expanded seed clusters. After growth of each of the identified seed clusters, the expanded seed clusters can be processed to identify expanded seed clusters that substantially overlap so as to remove duplicates. Each of the remaining expanded seed clusters includes a set of tokens and can represent a topic.

Optionally, the expanded seed clusters can be further processed to determine subtopics within the expanded seed cluster. For example, queries associated with the tokens included in the expanded seed cluster can be identified, and a query graph can be generated. Query clusters may then be determined based on similarities between the queries. Accordingly, each of the query clusters includes a set of queries within the expanded seed cluster and can represent a subtopic within the topic represented by the expanded seed cluster from which the query cluster was identified.

According to certain aspects of the present disclosure, one or more of the expanded seed clusters and/or query clusters may be associated with a node of a taxonomy in the creation and/or modification of a taxonomy that may be employed by an online service in connection with providing access to content items. Further, in exemplary implementations where the content items include associations and/or mappings to the corpus of queries, the nodes of the taxonomy (which are associated with one or more topics) can be transitively mapped to the content items.

Advantageously, exemplary embodiments of the present disclosure can overcome many shortcomings presented by traditional methods using machine learning models in the creation and/or modification of a taxonomy that may be employed by an online service in connection with providing access to content items. For example, creation of such taxonomies using traditional method can be an extremely laborious, time-consuming, and expensive process that is typically human expert and data intensive. The defining of taxonomy nodes, obtaining training data, training and producing a machine learning model, and the like can take a long time and be expensive to implement. Also, given the data intensive natures of these traditional methods, the time required to produce a machine learning model, evaluate its results, obtain and label additional training data, and the like can make modifying the taxonomy and/or the machine learning model very difficult. Further, linguistic issues of polysemy and synonymy can also contribute to the difficulties in training and producing accurate machine learning models. For example, traditional methods may have difficulty classifying interests having multiple nuanced interests, non-compositional queries, and the like.

In contrast, exemplary embodiments of the present disclosure can facilitate efficient and simple association of nodes of a taxonomy with one or more topics. For example, since the topics and tokens determined according to exemplary embodiments of the present disclosure are independent of any specific taxonomy, they can support various different taxonomies. Further, in view of the dependence of the topics and tokens on queries, the performance of the taxonomy can be evaluated quickly, and modifications (e.g., modifying nodes, re-associating topics, etc.) to the taxonomy can be performed simply and quickly, while avoiding the difficult, expensive, and long process of collecting and labeling training data.

Additionally, according to exemplary embodiments of the present disclosure, topics, which are comprised of sets of tokens, are determined based on an analysis of queries. Since users submitting the queries know the meaning of the queries being submitted, exemplary embodiments of the present disclosure can identify nuances associated with the queries (e.g., a keyword or interest may include multiple more nuanced interests, etc.) and identify the meaning of non-compositional queries (e.g., queries that are not the combination of the meaning of its n-grams, such as slang, idiomatic expressions, and the like). For example, in connection with a query directed to garlic, users may have various different interests in connection with garlic, such as cooking with garlic, growing garlic, eating garlic as a nutritional supplement, garlic as a repellent for vampires and witches, and the like. By way of another example, exemplary embodiments of the present disclosure can efficiently determine topics associated with queries that may be associated with multiple domains. For example, a query including the term "jaguars" may relate to the animal, the car brand, the football team, etc.

Further, because of the determination of topics based on queries and the assumption that the users submitting the queries know the meaning of the queries being submitted, exemplary embodiments of the present disclosure can determine the meaning of and properly classify non-compositional queries, i.e., queries that are not the combination of the meaning of its parts, such as slangs, idiomatic expressions, and the like. In this regard, such non-compositional queries may be associated with other queries in a query session, which can reflect the meaning of the non-compositional query. For example, exemplary embodiments of the present disclosure can efficiently determine that a query directed to the Bay of Pigs may be referencing the failed attempt to overthrow Fidel Castro, and not a body of water with pigs. Similarly, a query including the idiomatic expressing of "missing the boat," can be properly identified as a query directed to missed opportunities.

FIG. 1 is an illustration of an exemplary computing environment 100, according to exemplary embodiments of the present disclosure.

As shown in FIG. 1, computing environment 100 may include one or more client devices 102, 104, and/or 106, also referred to as user devices, which can allow users to connect over network 150 to access online service 110, which may execute on a network computing system. Online service 110 may include and/or communicate with one or more data store(s) 112, which may be configured to store and maintain a corpus of content items 114, which may include any type of digital content, such as digital images, videos, documents, etc. Online service 110 may form at least a portion of a social media platform or environment, a networking platform or environment, an e-commerce platform or environment, or any other form of interactive computing.

Client devices 102, 104, 106 and/or online service 110 may communicate via wired and/or wireless connections to network 150. Client devices 102, 104, and/or 106 may include any type of computing device, such as a smartphone, tablet, laptop computer, desktop computer, wearable, etc., and network 150 may include any wired or wireless network (e.g., the Internet, cellular, satellite, Bluetooth, Wi-Fi, etc.) that can facilitate communications between client devices 102, 104, and/or 106 and online service 110.

As illustrated in FIG. 1, users associated with client devices 102, 104, and/or 106 may access online service 110 via network 150 to search for, consume, browse, or otherwise access content items, such as content items included in corpus of content items 114. According to embodiments of the present disclosure, client devices 102, 104, and/or 106 may access and/or interact with online service 110 through network 150 via one or more applications operating and/or executing on client devices 102, 104, and/or 106. For example, users associated with client devices 102, 104, and/or 106 may launch and/or execute such an application on client devices 102, 104, and/or 106 to access and/or interact with online service 110 through network 150. According to aspects of the present disclosure, a user may, via execution of the application on client devices 102, 104, and/or 106, access or log into online service 110 by submitting one or more credentials (e.g., username/password, biometrics, secure token, etc.) through a user interface presented on client devices 102, 104, and/or 106. The credentials provided by the users may be verified by online service 110.

Once logged into online service 110, the user associated with one of client devices 102, 104, and/or 106 may submit a request for content items, access, and/or otherwise consume content items hosted and maintained by online service 110. For example, the request for content items may be included in a query (e.g., a text-based query, an image query, etc.), a request to access a homepage and/or home feed, a request for recommended content items, and the like. Alternatively and/or in addition, online service 110 may push content items to client devices 102, 104, and/or 106. For example, online service 110 may push content items to client devices 102, 104, and/or 106 on a periodic basis, after a certain time has elapsed, based on activity associated with client devices 102, 104, and/or 106 and online service 110, upon identification of relevant and/or recommended content items that may be provided to client devices 102, 104, and/or 106, and the like.

Accordingly, online service 110 may determine and identify content items (e.g., from corpus of content items 114) that are responsive to the request for content items (e.g., as part of a query, request to access a homepage and/or home feed, a request for recommended content, or any other request for content items) or a determination that content items are to be pushed to client devices 102, 104, and/or 106. In exemplary implementations, online service 110 may implement a taxonomy including a plurality of nodes, where each node is associated with one or more topics, and content items (e.g., from corpus of content items 114) are mapped to one or more nodes of the taxonomy, to facilitate provisioning of responsive content items. According to aspects of the present disclosure, a taxonomy can include a hierarchical structure including one or more nodes for categorizing, classifying, and/or otherwise organizing objects (e.g., content items). Each of the one or more nodes can be defined by an associated category, classification, etc., such as an interest, topic, and the like. Accordingly, the taxonomy implemented by online service 110 can facilitate efficient identification, determination, and/or provisioning of content items that are responsive to the request for content items (e.g., as part of a query, request to access a homepage and/or home feed, a request for recommended content, or any other request for content items) or a determination that content items are to be pushed to client devices 102, 104, and/or 106. Determination of topics that may be utilized in the creation of an exemplary taxonomy according to exemplary embodiments of the present disclosure is described in further detail herein in connection with at least FIGS. 2-7.

FIG. 2 is a flow diagram of an exemplary topic determination process 200, according to exemplary embodiments of the present disclosure.

As shown in FIG. 2, topic determination process 200 may begin with the obtaining of a set of queries, as in step 202. The set of queries obtained may correspond to a query session performed, and the queries comprising the set of queries may correspond to queries obtained during the query session. According to aspects of the present disclosure, a query session may include queries that are obtained from a single user over a relatively short period of time (e.g., 5 minutes, 10 minutes, 15 minutes, 30 minutes, 1 hour, 1 day, etc.). Often, queries within a query session may relate to a common topic and/or interest.

In step 204, the sets of queries can be processed to identify n-grams appearing in each set of queries. The identified n-grams preferably include unigrams and bigrams appearing in the queries of each respective set of queries. After determination of the n-grams, the queries and the n-grams may be processed, as in step 206, to determine which of the n-grams may be utilized as token. For example, the tokens may each include an n-gram (e.g., a unigram or a bigram) that appears in more than one query in each respective set of queries, i.e., n-grams appearing in more than one query within a particular query session. N-grams that only appear in a single query within each respective query session may be excluded from being utilized as a token, since n-grams only appearing in such queries typically provide relatively little informative value. For example, if a query session includes the query "Camero vs. Mustang" and the n-gram "Camero" only appears in the "Camero vs. Mustang" query (i.e., does not appear in any other query in the query session), the n-gram "Camero" would not be identified as a token. Conversely, if the n-gram "Camero" appeared in queries other than the "Camero vs. Mustang" query in the query session, the n-gram "Camero" would be identified as a token. The tokens appearing in each set of queries can then be associated with the queries from the respective set of queries in which they appear. For example, a bi-graph may be generated representing the associations between the queries and the tokens for each set of queries.

In exemplary embodiments of the present disclosure, the identification and association of tokens in query sessions can facilitate determination and/or classification of nuanced queries, queries relating to multiple domains, non-compositional queries, and the like. Since users submitting the queries know the meaning of the queries being submitted and the queries of a query session typically relate to a common topic and/or interest, the identification and association of tokens to queries within a query session facilitates identification of nuances associated with the queries (e.g., a keyword or interest may include multiple more nuanced interests, etc.), determination of topics associated with queries that may be associated with multiple domains, and/or identifying the meaning of non-compositional queries (e.g., queries that are not the combination of the meaning of its n-grams, such as slang, idiomatic expressions, and the like). For example, in connection with a query directed to garlic, exemplary embodiments of the present disclosure may facilitate determination of nuances within the query, such as cooking with garlic, growing garlic, eating garlic as a nutritional supplement, garlic as a repellent for vampires and witches, and the like. By way of another example, exemplary embodiments of the present disclosure can efficiently differentiate a domain of query including the term "jaguars" e.g., between the animal, the car brand, the football team, etc. Additionally, with respect to non-compositional queries (e.g., queries that are not the combination of the meaning of its parts, such as slangs, idiomatic expressions, and the like), exemplary embodiments of the present disclosure can efficiently determine that a query directed to the Bay of Pigs may be referencing the failed attempt to overthrow Fidel Castro, and not a body of water with pigs.

In step 208, the sets of queries (each which corresponds to a respective query session) may be aggregated. For example, all the queries presented in the sets of queries obtained from multiple users over a relatively long period of time (e.g., 1 month, 6 months, 1 year, etc.) may be aggregated to generate an aggregated corpus of queries. In aggregating the queries presented in the sets of queries, a frequency of the queries included in the sets of queries may be determined and compared against a minimum cumulative query threshold. Queries having a frequency below the minimum cumulative query threshold may be discarded in generating the corpus of aggregated corpus of queries.

After the queries have been aggregated, weighted associations between the tokens appearing in the aggregated corpus of queries and the queries comprising the aggregated corpus of queries may be determined, as in step 210. The weights may represent an association strength for each token-query association. For example, an aggregated token-query bi-graph representing the associations between the tokens and the queries may be generated where the edges of the aggregated token-query bi-graph may be weighted with the association strength for each token-query association. Accordingly, each token may have a weighted associated with one or more queries. According to exemplary embodiments of the present disclosure, the weights can correspond to a co-occurrence of a particular token and a particular query in view of the number of sessions in which each of the token and the query appear. For example, according to exemplary embodiments of the present disclosure, an association strength and an edge weight may be determined by:

$$w(q, n) = \log\frac{c(q, n)^2}{[q][n]} + \log\frac{c(q, n)}{[q]}$$

$$a(q, n) = w(q, n) - t_w \text{ for } (q, n) \in B \text{ iff } a(q, n) > 0$$

where w(q, n) can represent an association strength of query (q) and token (n), c(q, n) can represent a number of sessions where query (q) and token (n) co-occur, [q] can represent a number of sessions with query (q), [n] can represent a number of sessions with token (n), a(q, n) can represent an edge weight of the edge connecting query (q) and token (n) in the aggregated token-query bi-graph, $t_w$ can represent an association strength threshold, and B can represent the aggregated token-query bi-graph. Based on the equations above, it may be apparent that association strength is not dependent on the size of the corpus in which the query and/or the token appear(s). Accordingly, exemplary embodiments of the present disclosure are able to discover tokens for popular topics (e.g., with a large corpus of queries), as well as tokens for niche topics that are not associated with a large corpus of queries.

After the weighted aggregated token-query bi-graph has been generated, a weighted token graph may be generated based on the aggregated token-query bi-graph, as in step 212. According to exemplary embodiments of the present disclosure, based on the aggregated token-query bi-graph, similarity scores can be iteratively determined between the groups of queries that are associated with each token. For example, a Jaccard similarity index (or other similarity measure and/or technique) can be iteratively determined by processing the groups of queries. The weighted token graph can be generated based on the similarity scores in view of a minimum similarity score threshold, with the edge weights of the token graph corresponding to the determined similarity scores.

After the weighted token graph has been determined, in step 214, one or more seed clusters may be identified in the weighted token graph. The one or more seed clusters may be determined using a clustering technique, such as the Chinese Whispers algorithm. Alternatively, other clustering algorithms and/or techniques (e.g., K-means clustering, mean-shift clustering, random forest clustering, etc.) may be employed to determine the one or more seed clusters. According to certain aspects, since many tokens may be associated with multiple domains (e.g., a token "Jaguar" may relate to the animal, the automobile brand, the American football team, etc.), determining the one or more seed clusters may be preferably performed using soft clustering techniques, rather than hard clustering techniques. Alternatively and/or in addition, according to aspects of the present disclosure, tokens that relate to more than one domain may be divided into multiple nodes (e.g., for each domain) to generate a modified token graph, and hard clustering may be performed on the modified token graph. Identification and determination of seed clusters is described in further detail herein at least in connection with FIG. 3.

After the one or more seed clusters have been identified and/or determined, each seed cluster may be grown to include additional nodes of the weighted token graph, as in step 216. According to exemplary embodiments of the present disclosure, each seed cluster can be grown based on an average of the edge weights between the nodes in the seed cluster. For example, the seed clusters can be grown based on a threshold average edge weight. Initially, any seed clusters with an average edge weight below the threshold average edge weight can be discarded. For each remaining seed clusters, additional nodes (e.g., in accordance with descending edge weights) may be added to the seed cluster and the average edge weight for the expanded seed cluster may be determined. If the average edge weight is above the threshold average edge weight, another additional node may be added and the average edge weight for the expanded seed cluster may again be determined. This may be iteratively performed until it is determined that the addition of another node would result in an average edge weight that is below the threshold average edge weight, and the seed cluster is not grown any further.

In step 218, the grown seed clusters may be processed to determine seed clusters with substantial overlap. For example, seed clusters that may have been grown from nearby nodes may have substantial overlap and may be considered duplicative, and thereby removed. According to exemplary embodiments of the present disclosure, substantially overlapping grown seed clusters may be identified by determining a similarity score between the grown seed clusters (e.g., a Jaccard similarity index, etc.) and clusters having a similarity score to another grown seed cluster that exceeds a similarity threshold may be identified as being substantially duplicative, and one of the duplicative clusters may be discarded. Identification and determination of substantially overlapping grown seed clusters is described in further detail herein at least in connection with FIG. 4.

After substantially overlapping grown seed clusters are determined and discarded, the remaining grown seed clusters may be provided as topics, as in step 220. Accordingly, each topic may comprise a set of tokens which make up remaining grown seed cluster. According to exemplary embodiments of the present disclosure, the topics can be associated with nodes of a taxonomy in the creation of the taxonomy.

Figure 3:
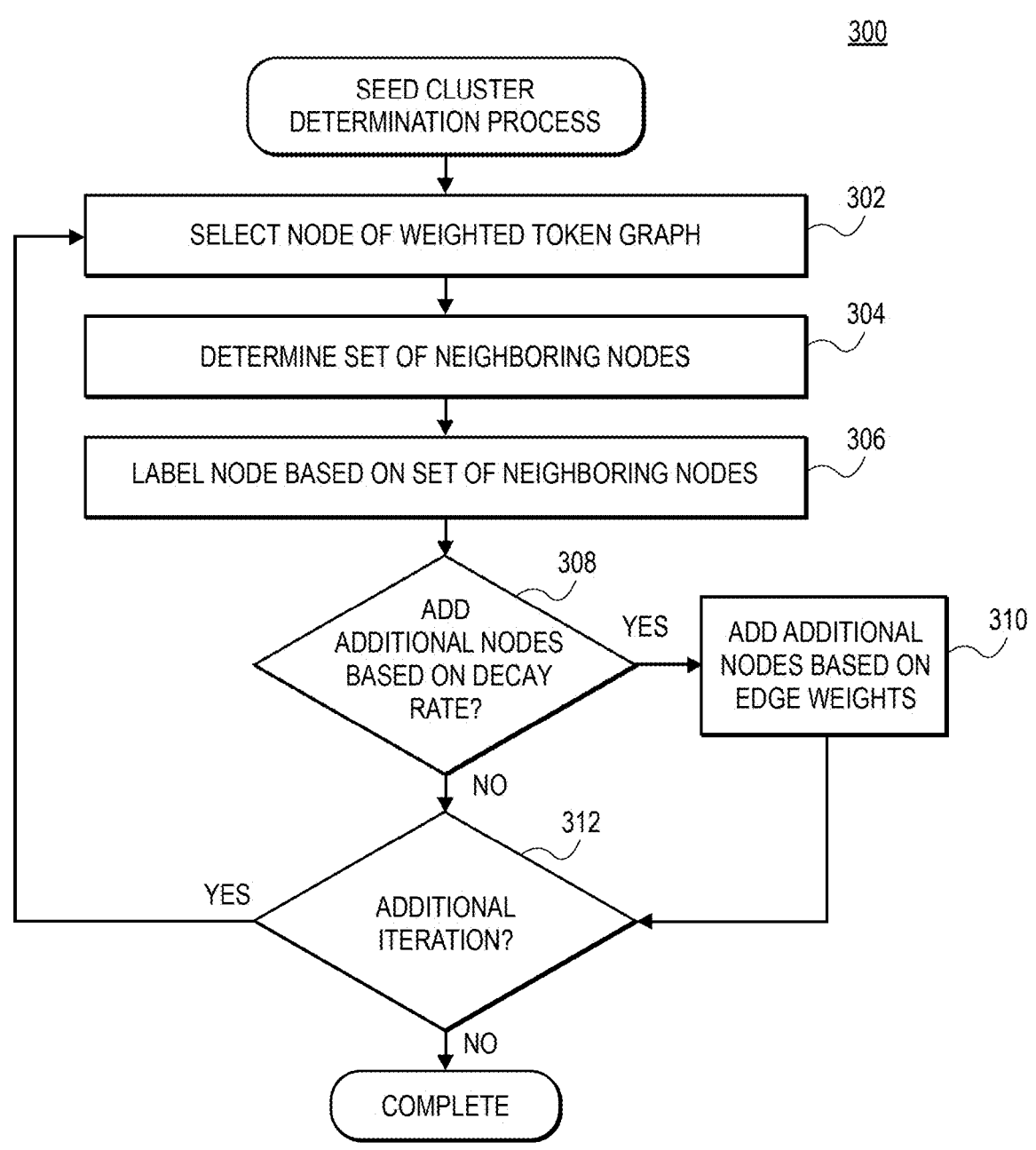
FIG. 3 is a flow diagram of an exemplary seed cluster determination process, according to exemplary embodiments of the present disclosure.

FIG. 3 is a flow diagram of an exemplary seed cluster determination process 300, according to exemplary embodiments of the present disclosure.

In the exemplary seed cluster determination process the one or more seed clusters may be determined by iteratively considering the ego-neighborhoods of each node of the weighted token graph. The ego-neighborhood of a particular node can include a subgraph of the weighted token graph comprising the selected node and its neighboring nodes. Hard clustering can be performed by labeling each node of the weighted token graph and iteratively determining a label for the particular node of each ego-neighborhood based on the labels of a majority of its neighboring nodes in the ego-neighborhood. The iterative determination of the label for the particular node of each ego-neighborhood may be performed for a predetermined iterations and/or until the label for the particular node of each ego-neighborhood converges.

As shown in FIG. 3, seed cluster determination process 300 may begin with the selection of a node in a weighted token graph, as in step 302. The weighted token graph may be generated, for example, during execution of topic determination process 200 and as further described herein in connection with FIGS. 6A-6L. According to aspects of the present disclosure, the selection of the node of the weighted token graph may be random. After the node has been selected, in step 304, a set of neighboring nodes to the set of neighboring nodes may be determined. The neighboring nodes may be selected, for example, based on the edge weights (e.g., determining the neighboring nodes with the relative highest associated edge weights).

After the set of neighboring nodes has been determined, the selected node may be labeled based on the set of neighboring nodes, as in step 306. For example, the selected node may be labeled based on the labels of a majority of the neighboring nodes. In step 308, it may be determined whether additional neighboring nodes are to be added in accordance with a decay rate (e.g., how quickly lower-weighted neighbors are added). If additional nodes are to be added, in step 310, additional nodes may be added in accordance with their associated edge weights (e.g., in an order of decreasing edge weights). If, based on the decay rate, additional nodes are not to be added, it can be determined whether a further iteration of the process is to be performed, as in step 312. For example, seed cluster determination process 300 may be performed a predetermined number of iterations and/or upon convergence of the labels for each selected node. If additional iterations are to be performed, seed cluster determination process 300 returns to step 302.

Figure 4:
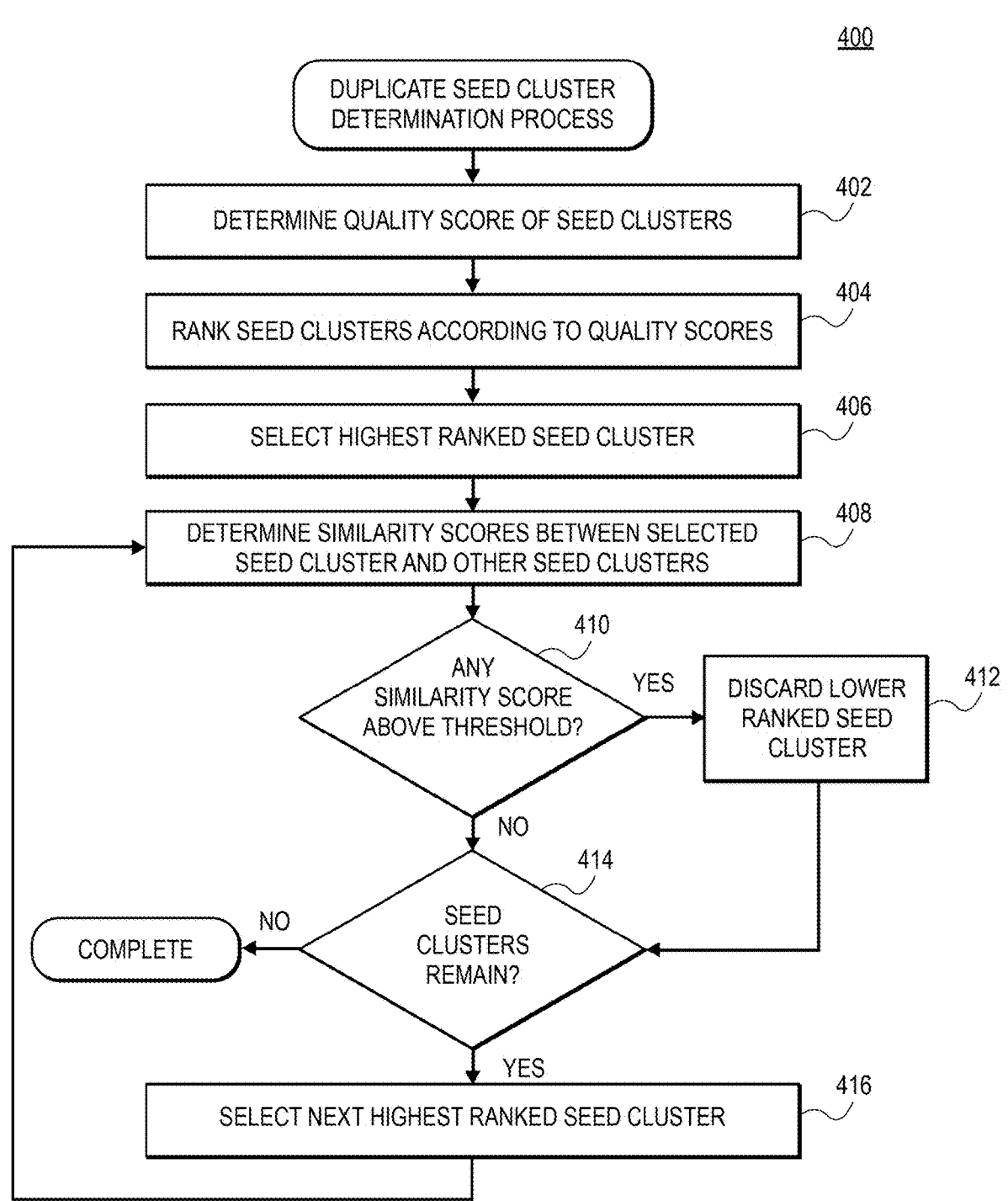
FIG. 4 is a flow diagram of an exemplary duplicate seed cluster determination process, according to exemplary embodiments of the present disclosure.

FIG. 4 is a flow diagram of an exemplary duplicate seed cluster determination process 400, according to exemplary embodiments of the present disclosure.

As shown in FIG. 4, duplicate seed cluster determination process 400 may begin with a determination of a quality score for each of the seed clusters, as in step 402. According to exemplary embodiments of the present disclosure, the quality score may be based on a number of nodes and a purity score associated with the seed cluster. The purity score may represent the degree of how well-formed each respective seed cluster may be. According to certain aspects, the purity score of a particular seed cluster can be determined by sorting the elements (e.g., tokens) of the particular seed cluster and its nodes neighboring according to a distance to the particular seed cluster, e.g., a distance to an average of the edge weights of the nodes (e.g., tokens) included within the particular seed cluster, with the nodes having the shortest distances appearing at the top of the sorted list. In a well-formed (e.g., "pure") seed clusters, the nodes of the seed cluster would appear higher than the neighboring nodes in the sorted list. However, in malformed and/or impure grown seed clusters, neighboring nodes may appear higher than nodes of the grown seed cluster in the sorted list. Based on the sorted list of clusters, a mean average precision score may be determined as the purity scores associated with each seed cluster.

After determination of the quality scores of the clusters, the seed cluster can be ranked in accordance with the quality scores, as in step 404. In step 404, the seed cluster with the highest rank may be selected, and in step 408, similarity scores (e.g., Jaccard similarity index, or other similarity measure) between the selected seed cluster and other seed clusters may be determined. In step 410, it can be determined whether any of the similarity scores exceeds a threshold value. If the similarity score between the selected seed cluster and another seed cluster exceeds the threshold, it can be assumed that the two seed clusters substantially overlap and are substantially duplicative. Accordingly, in step 412, the lower ranked seed cluster (e.g., in accordance with their respective quality scores) may be discarded.

In step 414, it can be determined if additional seed clusters remain to be processed in the ranked list. If further seed clusters are to be processed (e.g., determined in step 414), duplicate seed cluster determination process 400 may select the next highest ranked seed cluster, as in step 416, and the process may return to step 408 to iteratively process seed clusters until no further seed clusters remain for processing.

Figure 5:
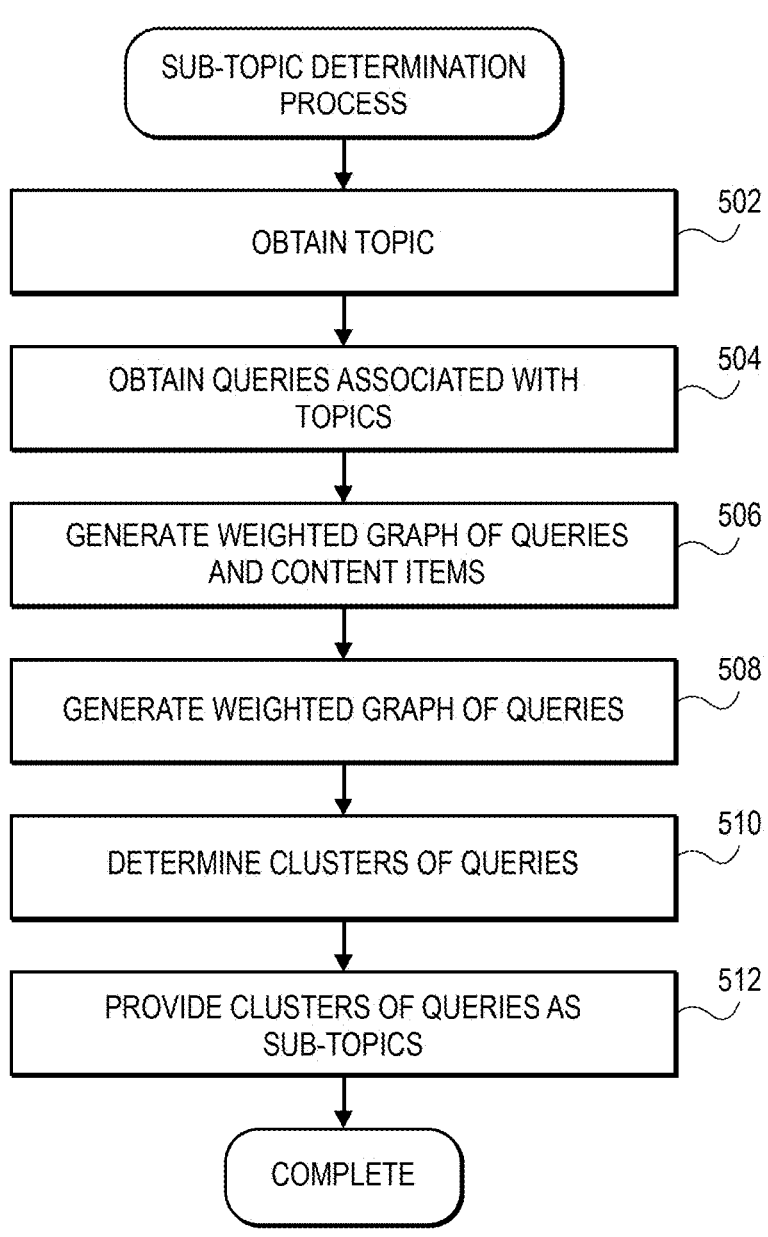
FIG. 5 is a flow diagram of an exemplary sub-topic determination process, according to exemplary embodiments of the present disclosure.

FIG. 5 is a flow diagram of an exemplary sub-topic determination process 500, according to exemplary embodiments of the present disclosure. In exemplary implementations, topics (e.g., determined by process 200) may be further processed to determine subtopics, which also may be used in the creation of a taxonomy. For example, certain topics may be associated with multiple domains, and determination of subtopics from a topic can facilitate further granularity in connection with a particular topic. In an exemplary implementation, a topic relating to the token "Avant Garde," which may refer to modern style, may refer to fashion/clothing/style, cuisine, architecture, and the like. Accordingly, determination of subtopics in connection with such topics can facilitate obtaining further granularity in connection with such topics.

As shown in FIG. 5, process 500 may begin by obtaining topics, as in step 502. According to exemplary embodiments of the present disclosure, the topics may be determined in accordance with exemplary topic determination process 200, as shown and described in connection with FIG. 2. In exemplary implementations of the present disclosure, topics may be comprised of a set of tokens, which may have been determined based on queries.

Accordingly, after the topics have been obtained, in step 504, the queries associated with the topics (e.g., the tokens comprising each topic) may be determined. Based on the queries, content items associated with the queries can be identified (e.g., since certain exemplary implementations contemplate that content items may already include associations and/or mappings to queries). Accordingly, a content item-query bi-graph representing the association between the queries and the content items can be generated, as in step 506. According to aspects of the present disclosure, the item-query bi-graph can be a weighted graph with the edge weights representing an association strength between the content items and queries. After the weighted content item-query bi-graph has been generated, a weighted query graph may be generated based on the content item-query bi-graph and content items, as in step 508. For example, a Jaccard similarity index (or other similarity measure and/or technique) of the content items associated with the queries can be determined, and the edge weights of the query graph can correspond to the determined similarity scores.

After the weighted query graph has been determined, in step 510, one or more clusters may be identified in the weighted query graph. The one or more clusters of queries may be determined using the weighted query graph (e.g., using a clustering technique and/or algorithm, such as K-means clustering, mean-shift clustering, random forest clustering, etc.). The clusters of queries can be provided as subtopics of the topic from which they were determined, as in step 512. Accordingly, each topic may be represented as a set of tokens and each subtopic may be represented as a set of queries.

According to exemplary embodiments of the present disclosure, based on the aggregated token-query bi-graph, similarity scores can be iteratively determined between the groups of queries that are associated with each token. For example, a Jaccard similarity index (or other similarity measure and/or technique) can be iteratively determined by processing the groups of queries. The weighted token graph can be generated based on the similarity scores in view of a minimum similarity score threshold, with the edge weights of the token graph corresponding to the determined similarity scores.

FIGS. 6A-6L are illustrations of exemplary graphs that may be generated in the determination of topics, according to exemplary embodiments of the present disclosure.

Figure 6A:
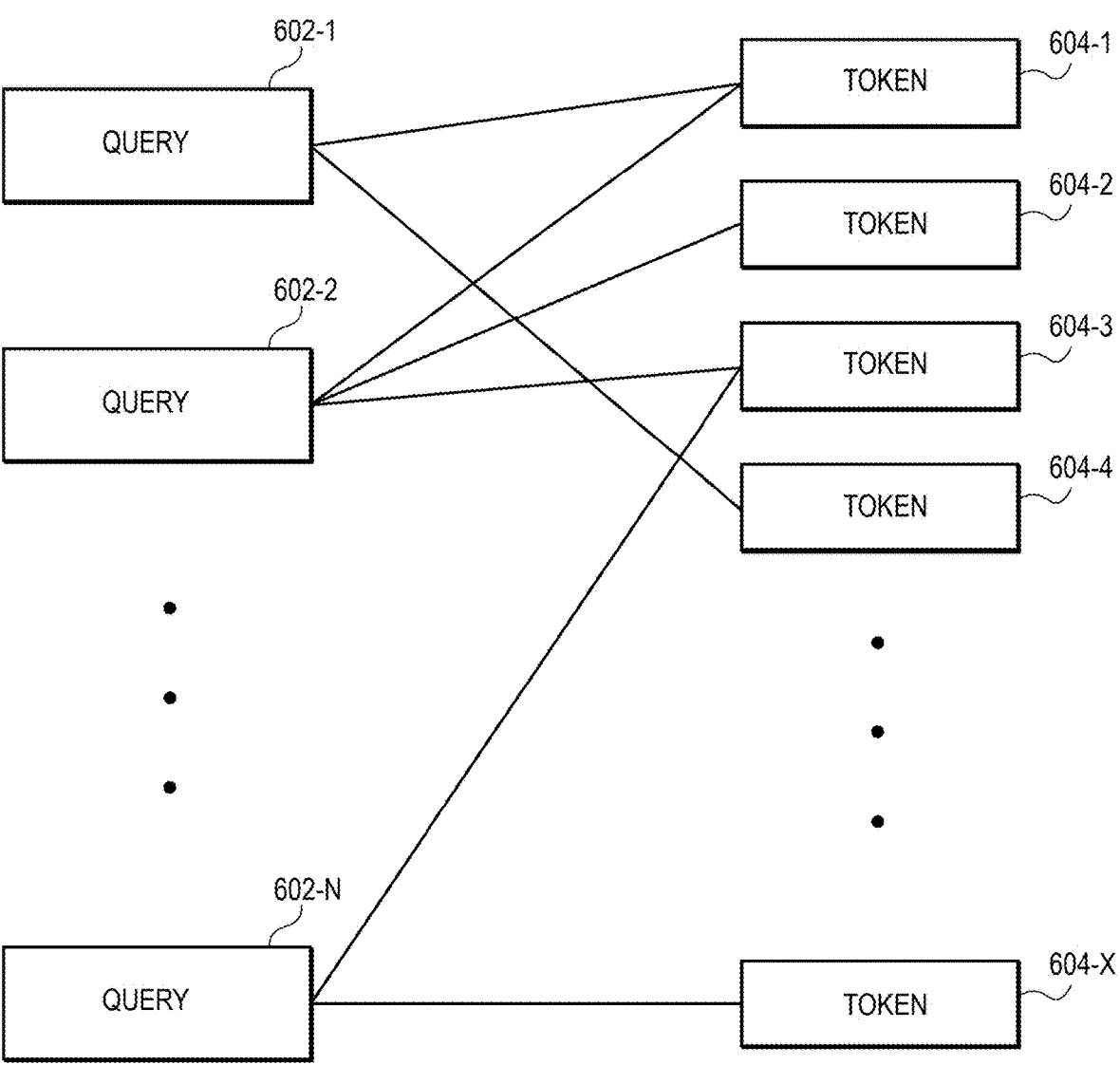
FIGS. 6A-6L are illustrations of exemplary graphs that may be generated in the determination of topics, according to exemplary embodiments of the present disclosure.
Figure 6B:
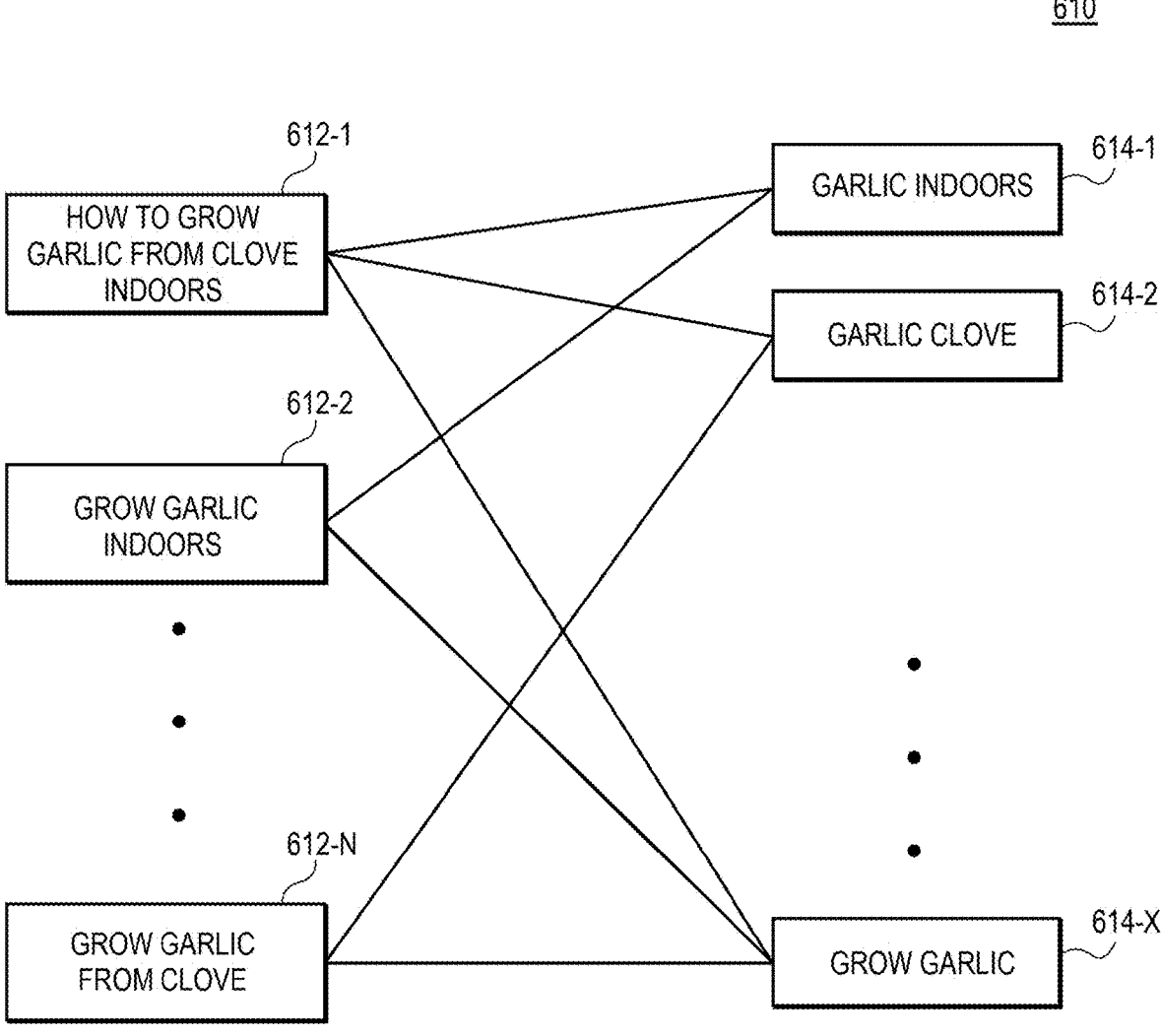
Figure 6C:
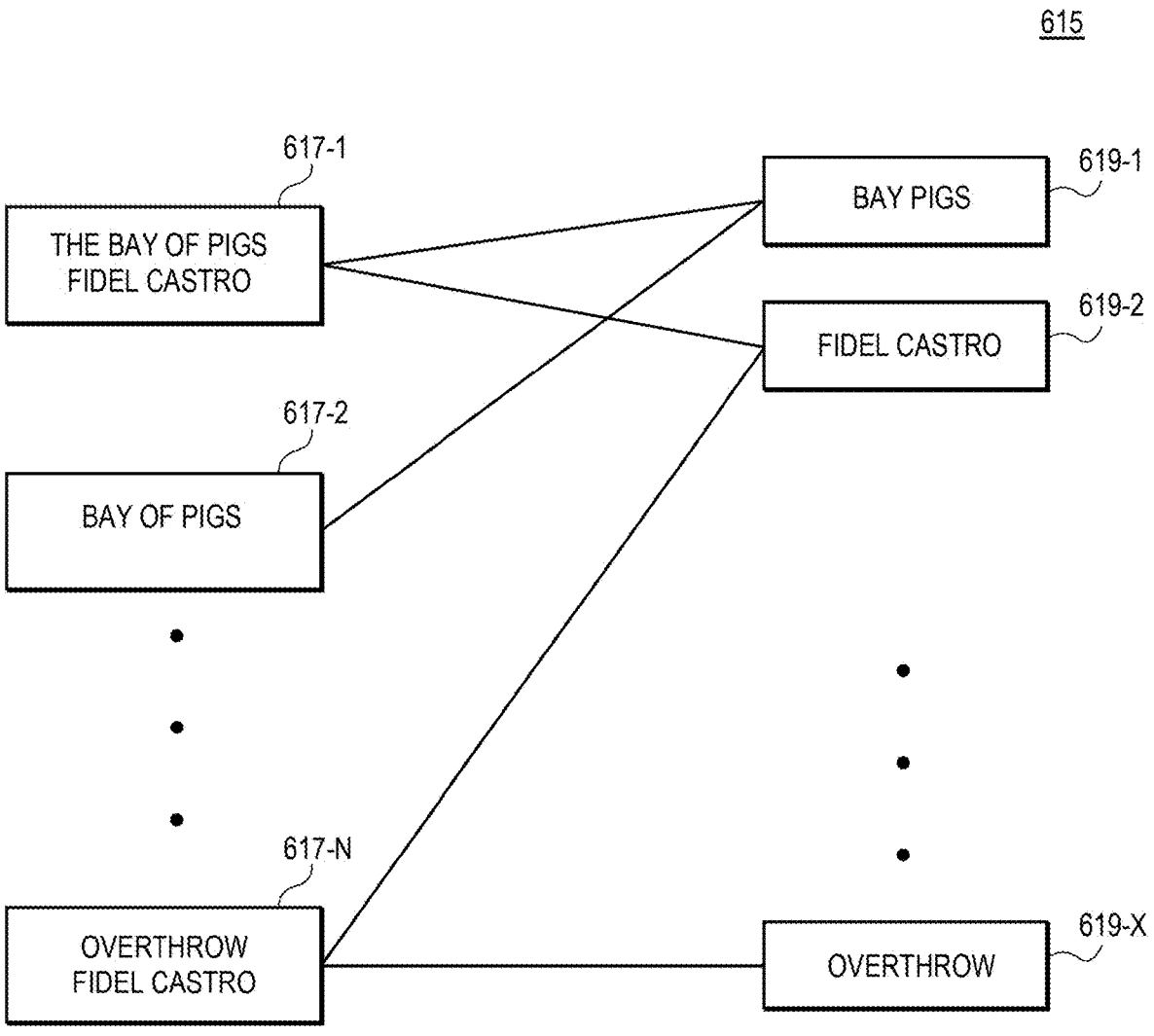

FIGS. 6A-6C illustrate exemplary unweighted query and token bi-graphs, according to exemplary embodiments of the present disclosure. FIG. 6A illustrates an exemplary unweighted query and token bi-graph 600 that may be generated in the determination of topics, according to exemplary embodiments of the present disclosure. As shown in FIG. 6A, query and token bi-graph 600 may include queries 602 and tokens 604. Queries 602 may include queries obtained during a query session and tokens 604 may include n-grams (e.g., unigrams and bigrams, etc.) appearing in queries 602. Further, as discussed herein in connection with FIG. 2, tokens 604 may exclude n-grams only appearing in a particular query within the particular query session. According to aspects of the present disclosure, a query session may include queries that are obtained from a single user over a relatively short period of time (e.g., 5 minutes, 10 minutes, 15 minutes, 30 minutes, 1 hour, 1 day, etc.). Often, queries within a query session may relate to a common topic and/or interest.

According to exemplary implementations of the present disclosure, queries 602 may be processed and analyzed to identify and/or determine tokens 604. After tokens 604 were identified and/or determined from queries 602, each token 604 may be associated with one or more of queries 602. As shown in FIG. 6A, token 604-1 may be associated with queries 602-1 and 602-2, token 604-2 may be associated with query 602-2, token 604-3 may be associated with query 602-2 and 602-N, token 604-4 may be associated with query 602-1, and token 604-X may be associated with query 602-N.

FIG. 6B illustrates an exemplary query and token bi-graph 610, according to exemplary embodiments of the present disclosure. Query and token bi-graph 610 shown in FIG. 6B illustrates an exemplary query and token bi-graph which may be generated in connection with an exemplary query session with nuanced queries relating to garlic. As shown in FIG. 6B, query 612-1 may include the query HOW TO GROW GARLIC FROM CLOVES INDOORS, query 612-2 may include the query GROW GARLIC INDOORS, query 612-N may include the query GROW GARLIC FROM CLOVE. Accordingly, tokens 614 may have been identified and/or determined from queries 612, and in query and token bi-graph 610, the associations between queries 612 and tokens 614 may be shown. As illustrated in FIG. 6B, token 614-1 GARLIC INDOORS may be associated with query 612-1 and 612-2, token 614-2 GARLIC CLOVE may be associated with queries 612-1 and 612-N, and token 614-X GROW GARLIC may be associated with queries 612-1, 612-2, and 612-N.

FIG. 6C illustrates an exemplary query and token bi-graph 615, according to exemplary embodiments of the present disclosure. Query and token bi-graph 615 shown in FIG. 6C illustrates an exemplary query and token bi-graph which may be generated in connection with an exemplary query session with non-compositional queries relating to the Bay of Pigs. As shown in FIG. 6C, query 617-1 may include the query THE BAY OF PIGS FIDEL CASTRO, query 617-2 may include the query BAY OF PIGS, query 617-N may include the query OVERTHROW FIDEL CASTRO. Accordingly, tokens 619 may have been identified and/or determined from queries 617, and in query and token bi-graph 615, the associations between queries 617 and tokens 619 may be shown. As illustrated in FIG. 6C, token 619-1 BAY PIGS may be associated with query 617-1 and 617-2, token 619-2 FIDEL CASTRO may be associated with queries 617-1 and 617-N, and token 619-X OVERTHROW may be associated with query 617-N.

Figure 6D:
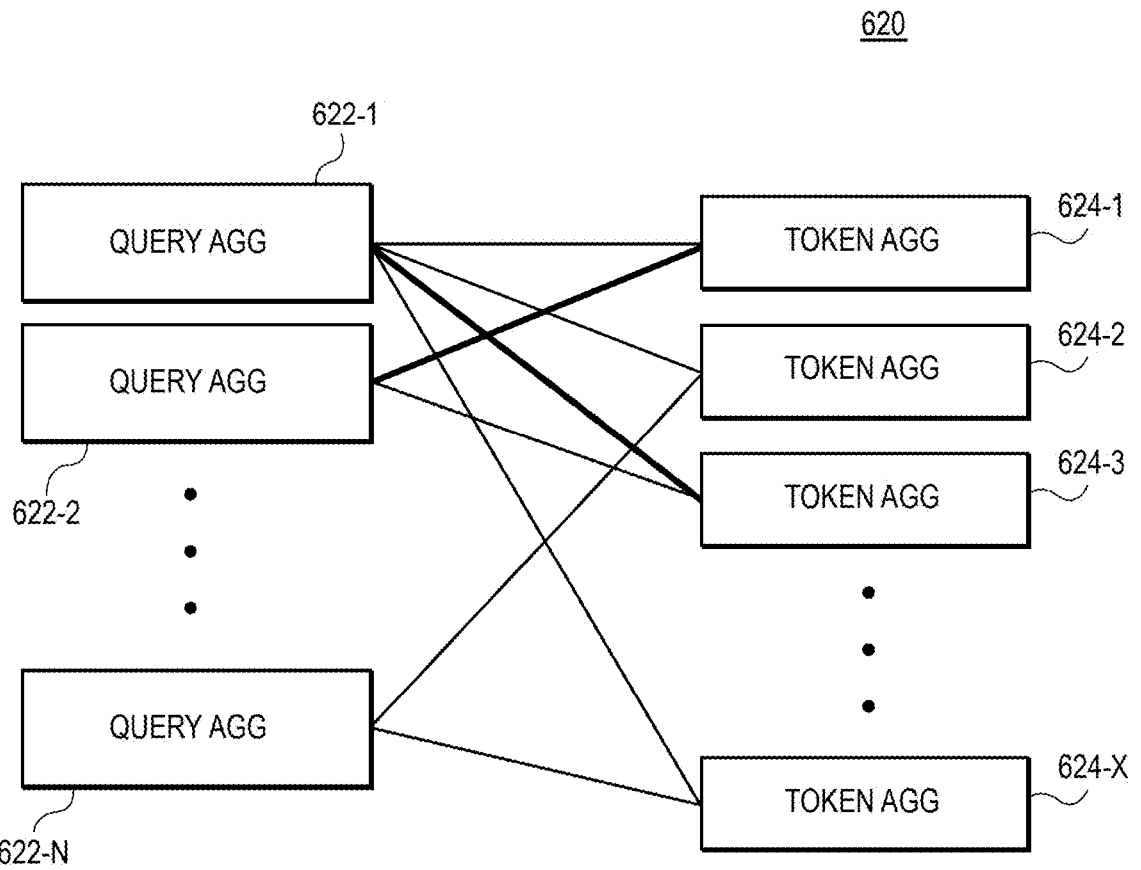
Figure 6E:
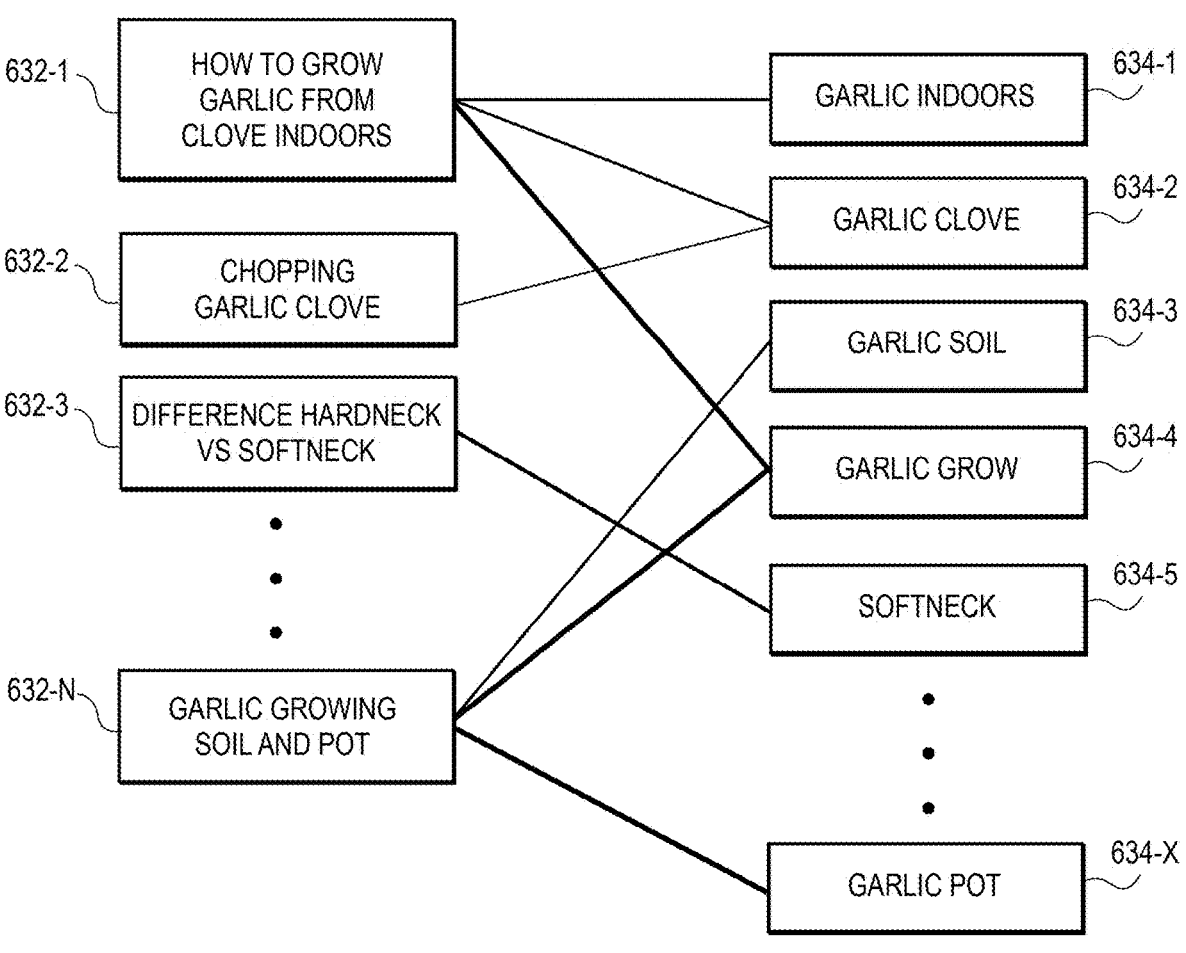
Figure 6F:
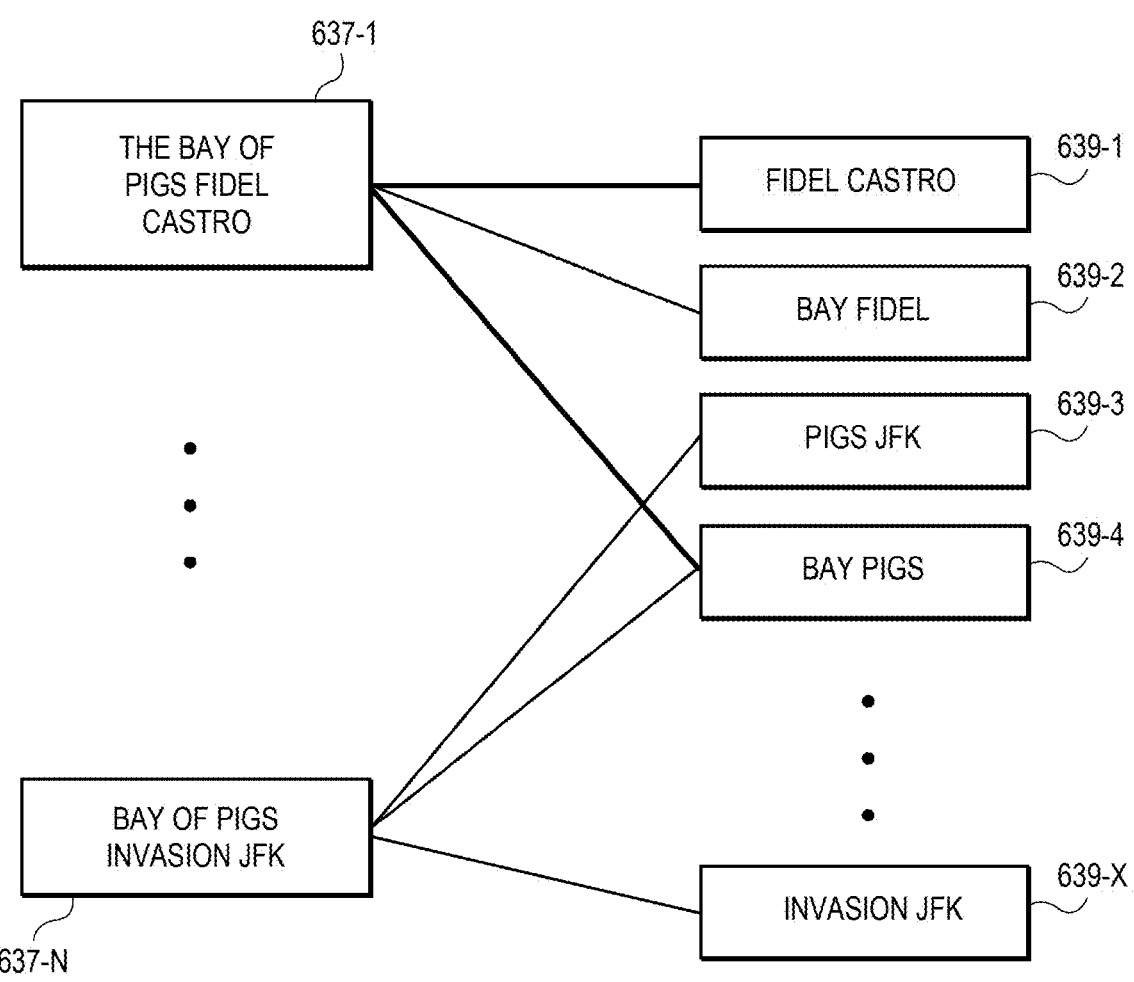

After queries and tokens for multiple query sessions have been compiled, the queries and tokens in the various query sessions may be aggregated, and a weighted query and token bi-graph may be generated with the aggregated queries and tokens. FIGS. 6D-6F illustrate exemplary weighted query and token bi-graphs that may be generated in connection with determining a topic, according to exemplary embodiments of the present disclosure. For example, all the queries presented in the sets of queries obtained from multiple users over a relatively long period of time (e.g., 1 month, 6 months, 1 year, etc.) may be aggregated to generate an aggregated corpus of queries. In aggregating the queries presented in the sets of queries, a frequency of the queries included in the sets of queries may be determined and compared against a minimum cumulative query threshold. Queries having a frequency below the minimum cumulative query threshold may be discarded in generating the corpus of aggregated corpus of queries.

As shown in FIG. 6D, weighted query and token bi-graph 620 may illustrate that token 624-1 may be associated with queries 622-1 and 622-2, token 624-2 may be associated with queries 622-1 and 622-N, token 624-3 may be associated with queries 622-1 and 622-2, and token 624-X may be associated with queries 622-1 and 622-N, where the thicker lines may represent a higher edge weight. According to exemplary embodiments of the present disclosure, the edges associating queries 622 and tokens 624 may be weighted to represent an association strength between each associated query 622 and token 624. Accordingly, each token may have a weighted associated with one or more queries, which may form a group of queries. According to exemplary embodiments of the present disclosure, the weights can correspond to a co-occurrence of a particular token and a particular query in view of the number of sessions in which each of the token and the query appear. For example, according to exemplary embodiments of the present disclosure, an association strength and an edge weight may be determined by:

$$w(q, n) = \log\frac{c(q, n)^2}{[q][n]} + \log\frac{c(q, n)}{[q]}$$

$$a(q, n) = w(q, n) - t_w \text{ for } (q, n) \in B \text{ iff } a(q, n) > 0$$

where w(q, n) can represent an association strength of query (q) and token (n), c(q, n) can represent a number of sessions where query (q) and token (n) co-occur, [q] can represent a number of sessions with query (q), [n] can represent a number of sessions with token (n), a(q, n) can represent an edge weight of the edge connecting query (q) and token (n) in the aggregated query and token bi-graph, $t_w$ can represent an association strength threshold, and B can represent the aggregated query and token bi-graph. Based on the equations above, it is apparent that association strength is not dependent on the size of the corpus in which the query and/or the token appear(s). Accordingly, exemplary embodiments of the present disclosure are able to discover tokens for popular topics (e.g., with a large corpus of queries), as well as tokens for niche topics that are not associated with a large corpus of queries.

FIG. 6E illustrates an exemplary weighted query and token bi-graph 630, according to exemplary implementations of the present disclosure. Weighted query and token bi-graph 630 shown in FIG. 6E continues the example implementation illustrated in FIG. 6B, and shows an example weighted query and token bi-graph which may be generated in connection with an aggregation of query sessions including queries relating to garlic, where the thicker lines may represent a higher edge weight. As shown in FIG. 6E, the aggregation of queries and tokens may include query 632-1 HOW TO GROW GARLIC FROM CLOVES INDOORS, query 632-2 CHOPPING GARLIC CLOVE, query 632-3 DIFFERENCE HARDNECK VS SOFTNECK, query 632-N GARLIC GROWING SOIL AND POT, token 634-1 GARLIC INDOORS, token 634-2 GARLIC CLOVE, token 634-3 GARLIC SOIL, token 634-4 GARLIC GROW, token 634-5 SOFTNECK, and token 634-X GARLIC POT. As illustrated in FIG. 6E, token 634-1 GARLIC INDOORS may be associated with query 632-1 HOW TO GROW GARLIC FROM CLOVES INDOORS, token 634-2 GARLIC CLOVE may be associated with query 632-1 HOW TO GROW GARLIC FROM CLOVES INDOORS and query 632-2 CHOPPING GARLIC CLOVE, token 634-3 GARLIC SOIL may be associated with query 632-N GARLIC GROWING SOIL AND POT, token 634-4 GARLIC GROW may be associated with query 632-1 HOW TO GROW GARLIC FROM CLOVES INDOORS and query 632-N GARLIC GROWING SOIL AND POT, token 634-5 may be associated with query 632-3 DIFFERENCE HARDNECK VS SOFTNECK, and token 634-X GARLIC POT may be associated with query 632-N GARLIC GROWING SOIL AND POT.

FIG. 6F illustrates an exemplary weighted query and token bi-graph 635, according to exemplary implementations of the present disclosure. Weighted query and token bi-graph 635 shown in FIG. 6F continues the example implementation illustrated in FIG. 6C, and shows an example weighted query and token bi-graph which may be generated in connection with an aggregation of query sessions including queries relating to garlic, where the thicker lines may represent a higher edge weight. As shown in FIG. 6F, the aggregation of queries and tokens may include query 637-1 THE BAY OF PIGS FIDEL CASTRO, query 637-N BAY OF PIGS INVASION JFK, token 639-1 FIDEL CASTRO, token 639-2 BAY FIDEL, token 639-3 PIGS JFK, token 639-4 BAY PIGS, and token 639-X INVASION JFK. As illustrated in FIG. 6F, token 639-1 FIDEL CASTRO may be associated with query 635-1 THE BAY OF PIGS FIDEL CASTRO, token 639-2 BAY FIDEL may be associated with query 637-1 THE BAY OF PIGS FIDEL CASTRO, token 639-3 PIGS JFK may be associated with query 637-N BAY OF PIGS INVASION JFK, token 639-4 BAY PIGS may be associated with query 637-1 THE BAY OF PIGS FIDEL CAST and query 637-N BAY OF PIGS INVASION JFK, and token 639-X INVASION JFK may be associated with query 637-N BAY OF PIGS INVASION JFK.

Figure 6G:
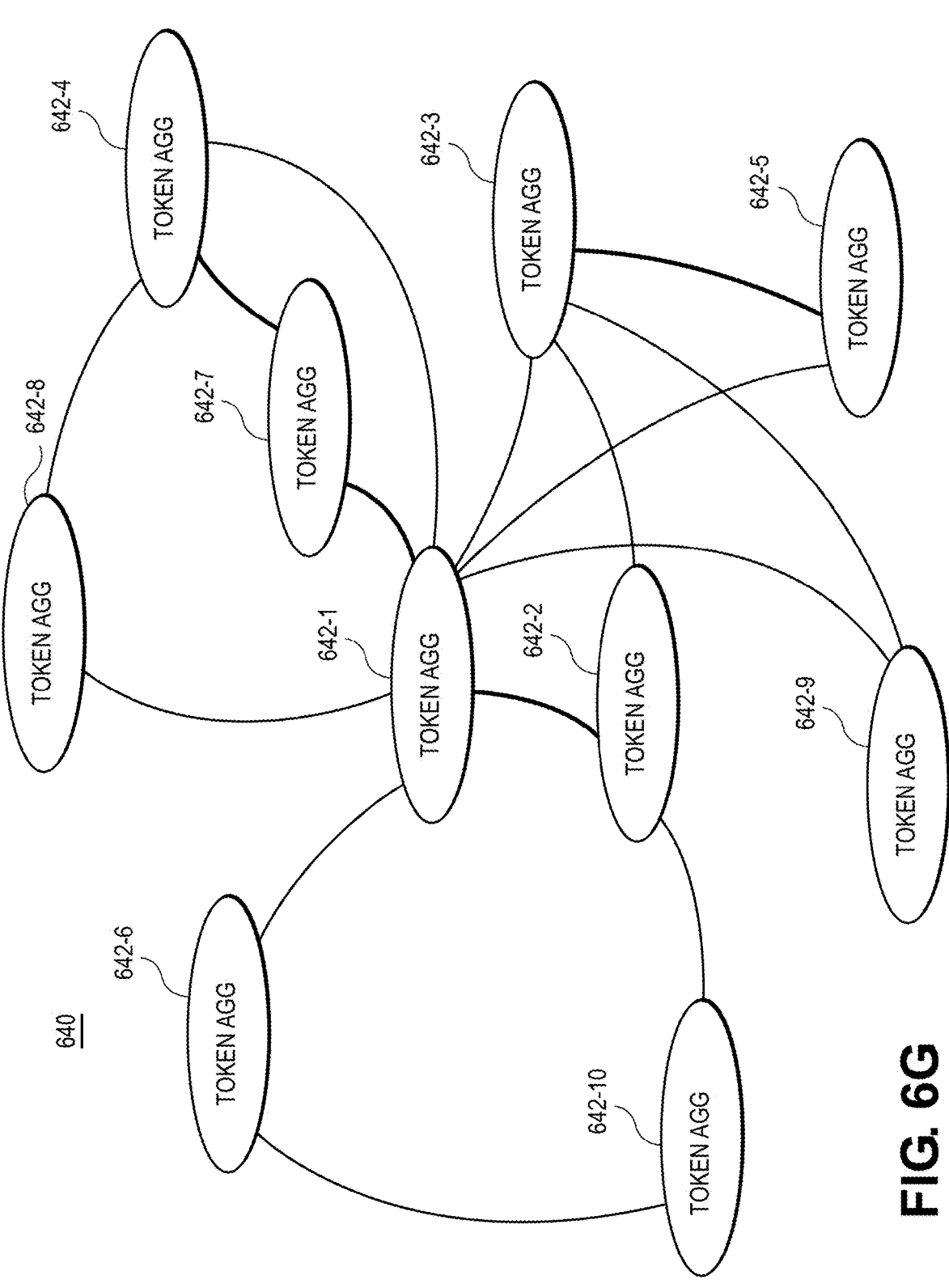
Figure 6H:
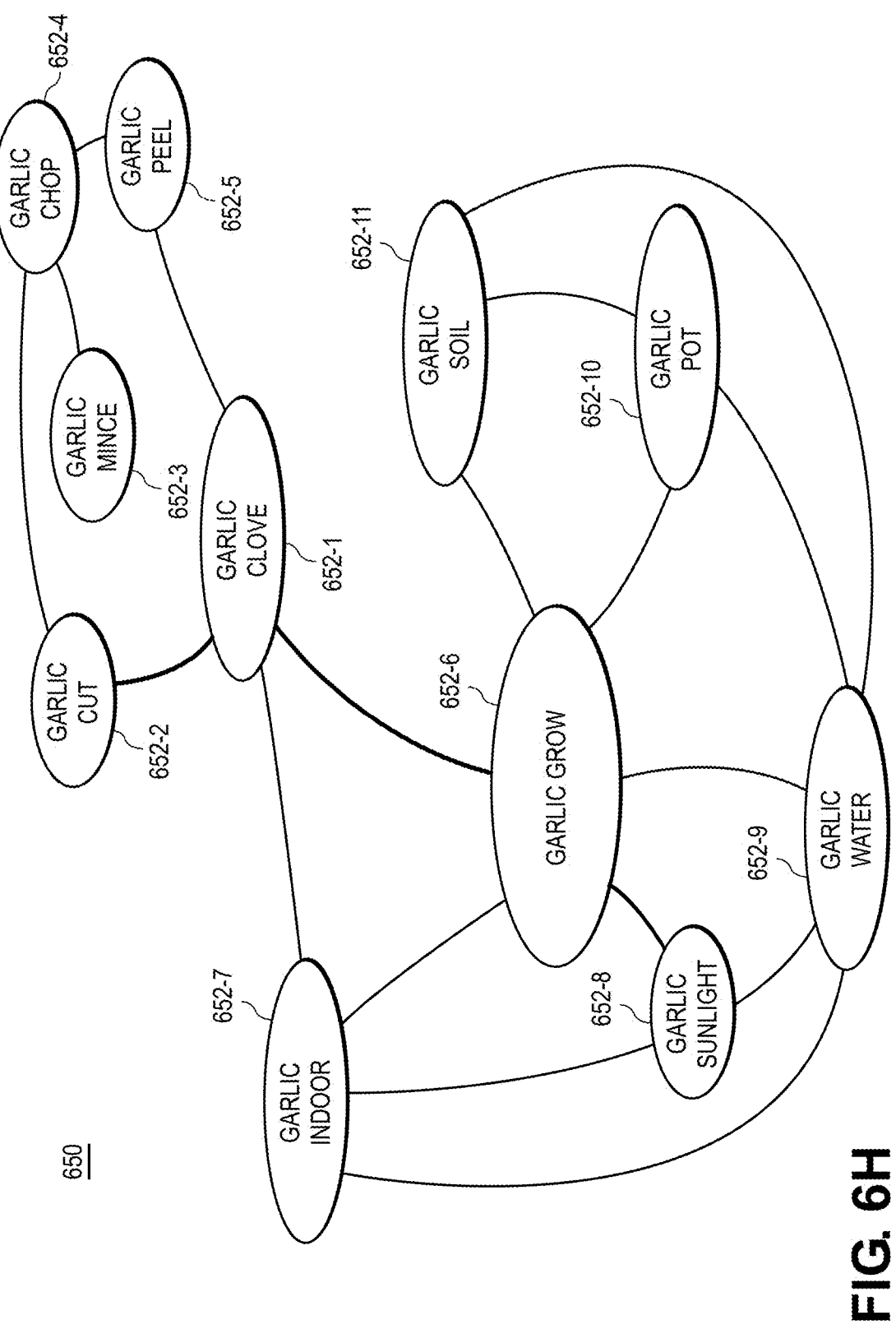
Figure 6I:
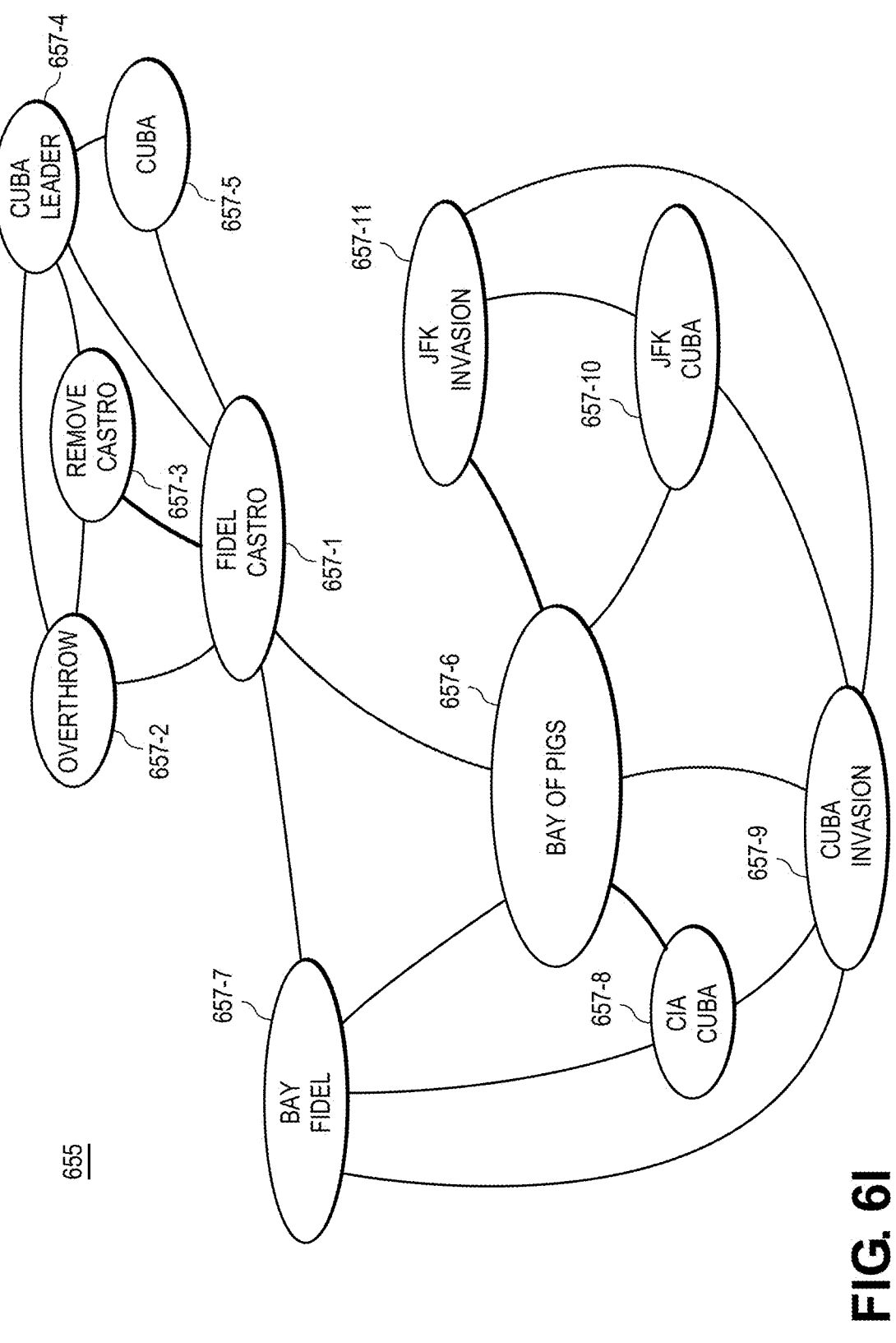

After the weighted aggregated token-query bi-graph has been generated, a weighted token graph may be generated based on the aggregated query and token bi-graph. According to exemplary embodiments of the present disclosure, based on the aggregated query and token bi-graph, similarity scores can be iteratively determined between the groups of queries that are associated with each token. For example, a Jaccard similarity index (or other similarity measure and/or technique) can be iteratively determined by processing the groups of queries. The weighted token graph can be generated based on the similarity scores in view of a minimum similarity score threshold, with the edge weights of the token graph corresponding to the determined similarity scores. FIGS. 6G-6I illustrate exemplary weighted token graphs that may be generated in connection with determining a topic, according to exemplary embodiments of the present disclosure.

FIG. 6G illustrates an exemplary weighted token graph 640, according to exemplary embodiments of the present disclosure. For example, weighted token graph 640 may have been generated by determining similarity scores (e.g., Jaccard similarity indexes, etc.) between tokens and queries (e.g., based on a weighted query and token bi-graph, such as weighted query and token bi-graph 620), where the thicker lines may represent higher edge weights. Accordingly, the edges of weighted token graph 640 may correspond to the determined similarity scores for tokens 642 included in weighted token graph 640. As shown in FIG. 6G, token 642-1 may be connected to tokens 642-2, 642-3, 642-4, 642-5, 642-6, 642-7, 642-8, and 642-9. Further, token 642-2 may be connected to tokens 642-1, 642-3, and 642-10; token 642-3 may be connected to tokens 642-1, 642-2, 642-5, and 642-9; token 642-4 may be connected to tokens 642-1, 642-7, and 642-8; token 642-5 may be connected to tokens 642-1 and 642-3; token 642-6 may be connected to tokens 642-1 and 642-10; token 642-7 may be connected to tokens 642-1 and 642-4; token 642-8 may be connected to tokens 642-1 and 642-4; token 642-9 may be connected to tokens 642-1 and 642-3; and token 642-10 may be connected to tokens 642-2 and 642-6. Further, each of the edges connecting the respective tokens may be weighted with a similarity score representing the similarity between the corresponding tokens connected by each respective edge.

FIG. 6H illustrates an exemplary weighted token graph 650, according to exemplary implementations of the present disclosure. Weighted token graph 650 shown in FIG. 6H continues the example implementation illustrated in FIGS. 6B and 6E, and shows an example weighted token graph which may have been generated in connection with determinations of similarity of tokens in connection with an aggregation of query sessions including queries relating to garlic, where the thicker lines may represent higher edge weights. As shown in FIG. 6H, token 652-1 may be connected to tokens 652-2, 652-5, 652-6, and 652-7; token 652-2 may be connected to tokens 652-1 and 652-4; token 652-3 may be connected to token 652-4; token 652-4 may be connected to tokens 652-2, 652-3, and 652-5; token 652-5 may be connected to tokens 652-1 and 642-4; token 652-6 may be connected to tokens 652-1, 652-7, 652-8, 652-9, 652-10, and 652-11; token 652-7 may be connected to tokens 652-1, 652-6, 652-8, and 652-9; token 652-8 may be connected to tokens 652-6, 652-7, and 652-9; token 652-9 may be connected to tokens 652-6, 652-7, 652-8, 652-10, and 652-11; token 652-10 may be connected to tokens 652-6, 652-9, and 652-11; and token 652-11 may be connected to tokens 652-6, 652-9, and 652-10. Further, each of the edges connecting the respective tokens may be weighted with a similarity score representing the similarity between the corresponding tokens connected by each respective edge.

FIG. 6I illustrates an exemplary weighted token graph 655, according to exemplary implementations of the present disclosure. Weighted token graph 655 shown in FIG. 6I continues the example implementation illustrated in FIGS. 6C and 6F, and shows an example weighted token graph which may have been generated in connection with determinations of similarity of tokens in connection with an aggregation of query sessions including queries relating to the Bay of Pigs invasion in Cuba. As shown in FIG. 6I, token 657-1 may be connected to tokens 657-2, 657-3, 657-4, 657-5, 657-6, and 657-7; token 657-2 may be connected to tokens 657-1, 657-3, and 657-4; token 657-3 may be connected to tokens 657-1, 657-2, and 657-4; token 657-4 may be connected to tokens 657-1, 657-2, 657-3, and 657-5; token 657-5 may be connected to tokens 657-1 and 657-4; token 657-6 may be connected to tokens 657-1, 657-7, 657-8, 657-9, 657-10, and 657-11; token 657-7 may be connected to tokens 657-1, 657-6, 657-8, and 657-9; token 657-8 may be connected to tokens 657-6, 657-7, and 657-9; token 657-9 may be connected to tokens 657-6, 657-7, 657-8, 657-10, and 657-11; token 657-10 may be connected to tokens 657-6, 657-9, and 657-11; and token 657-11 may be connected to tokens 657-6, 657-9, and 657-10. Further, each of the edges connecting the respective tokens may be weighted with a similarity score representing the similarity between the corresponding tokens connected by each respective edge.

Figure 6J:
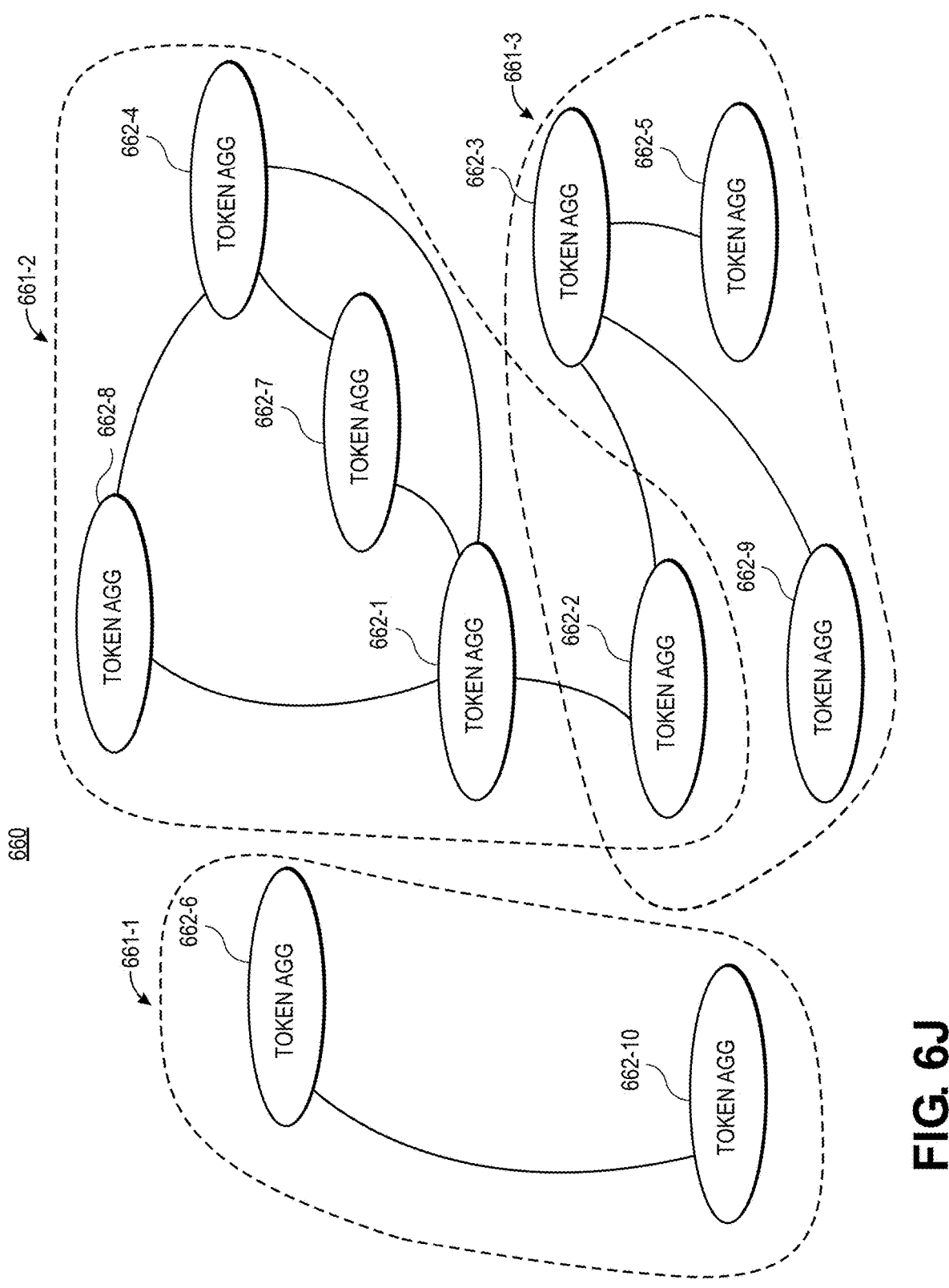
Figure 6K:
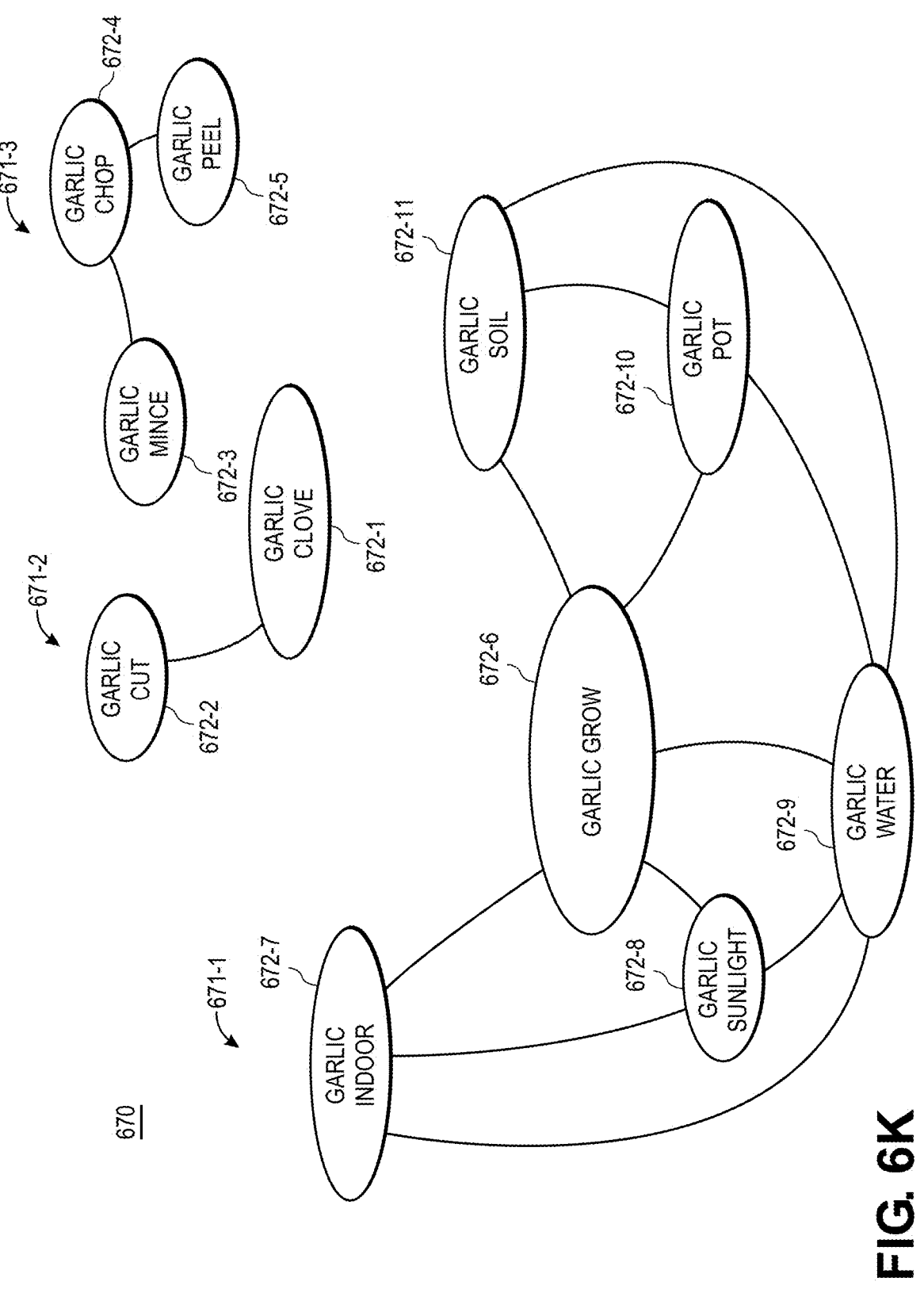
Figure 6L:
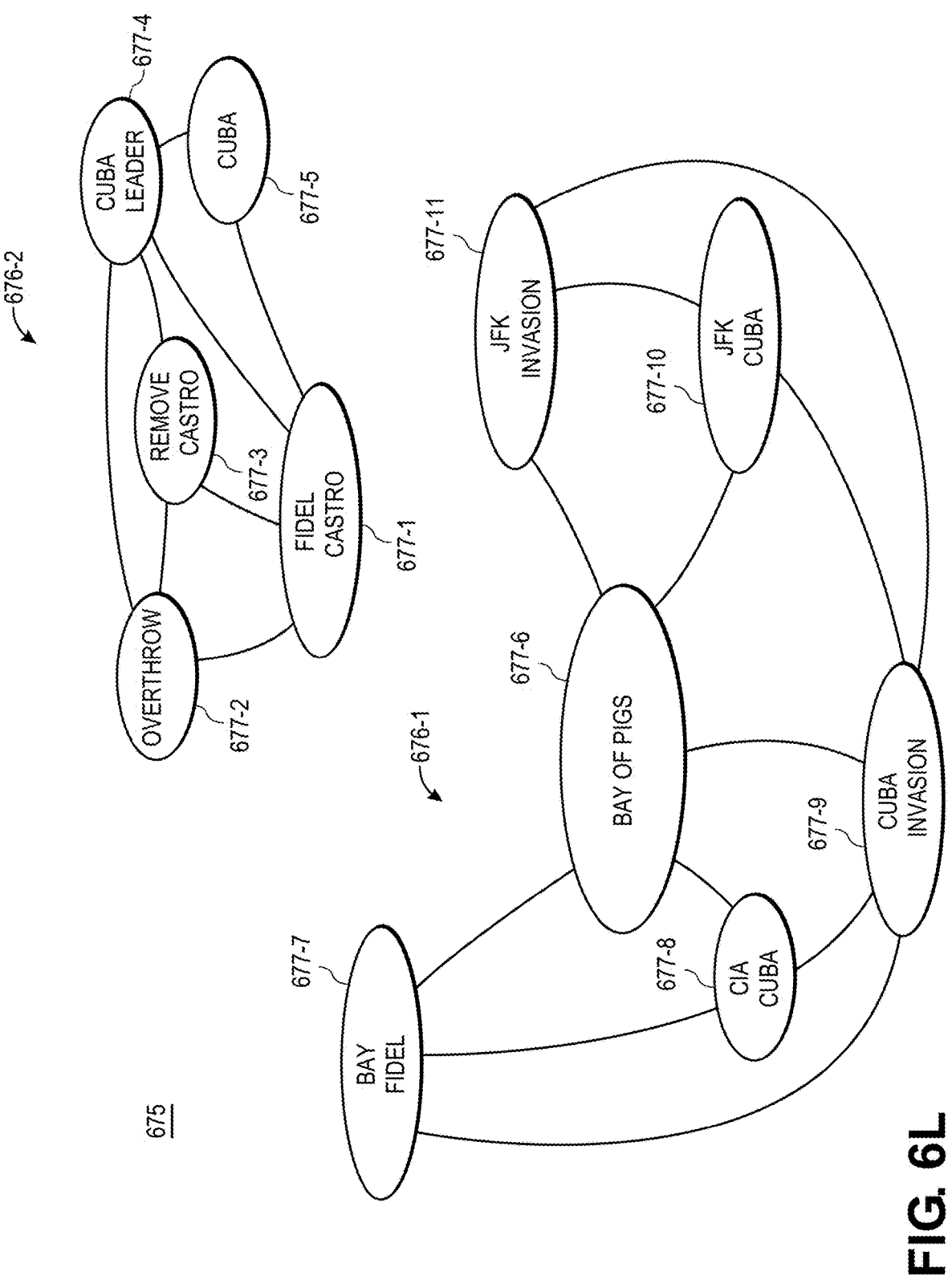

After the weighted token graph has been determined, one or more seed clusters may be identified in the weighted token graph. The one or more seed clusters may be determined using a clustering technique, such as the Chinese Whispers algorithm. Alternatively, other clustering algorithms and/or techniques (e.g., K-means clustering, mean-shift clustering, random forest clustering, etc.) may be employed to determine the one or more seed clusters. According to certain aspects, since many tokens may be associated with multiple domains (e.g., a token "Jaguar" may relate to the animal, the automobile brand, the American football team, etc.), determining the one or more seed clusters may be preferably performed using soft clustering techniques, rather than hard clustering techniques. Alternatively and/or in addition, according to aspects of the present disclosure, tokens that relate to more than one domain may be divided into multiple nodes (e.g., for each domain) to generate a modified token graph, and hard clustering may be performed on the modified token graph. Identification and determination of seed clusters is described in further detail herein at least in connection with FIGS. 2 and 3. FIGS. 6J-6L illustrate exemplary seed clusters identified in a weighted token graph.

FIG. 6J illustrates exemplary seed clusters 660 that may have been identified from weighted token graph 640, according to exemplary embodiments of the present disclosure. For example, seed clusters 661 may have been identified, using a clustering algorithm or technique such as the Chinese Whispers algorithm, in connection with weighted token graph 640. As shown in FIG. 6J, seed cluster 661-1 may include tokens 662-6 and 662-10, seed cluster 661-2 may include tokens 662-1, 662-2, 662-4, 662-7, and 662-8, and seed cluster 661-3 may include tokens 662-2, 662-3, 662-5, and 662-9. Accordingly, clusters may overlap (e.g., tokens may belong to more than one cluster), as token 662-2 may belong to both cluster 661-2 and 661-3.

FIG. 6K illustrates exemplary seed clusters 670 that may have been identified from weighted token graph 650, according to exemplary implementations of the present disclosure, and continues the example implementation illustrated in FIGS. 6B, 6E, and 6H in connection with determinations of clusters of tokens in connection with queries relating to garlic. For example, seed clusters 671 may have been identified, using a clustering algorithm or technique such as the Chinese Whispers algorithm, in connection weighted token graph 650. As shown in FIG. 6K, seed cluster 671-1 may include tokens 672-6, 672-7, 672-8, 672-9, 672-10, and 672-11, seed cluster 671-2 may include tokens 672-1 and 672-2, and seed cluster 671-3 may include tokens 672-3, 672-4, and 672-5.

FIG. 6L illustrates exemplary seed clusters 675 that may have been identified from weighted token graph 655, according to exemplary implementations of the present disclosure, and continues the example implementation illustrated in FIGS. 6C, 6F, and 6I in connection with determinations of clusters of tokens in connection with queries relating to the Bay of Pigs invasion in Cuba. For example, seed clusters 676 may have been identified, using a clustering algorithm or technique such as the Chinese Whispers algorithm, in connection weighted token graph 655. As shown in FIG. 6L, seed cluster 676-1 may include tokens 677-6, 677-7, 677-8, 677-9, 677-10, and 677-11 and seed cluster 676-2 may include tokens 677-1, 677-2, 677-3, 677-4, and 677-5.

After the one or more seed clusters have been identified and/or determined, each seed cluster may be grown to include additional nodes of the weighted token graph. According to exemplary embodiments of the present disclosure, each seed cluster can be grown based on an average of the edge weights between the nodes in the seed cluster. For example, the seed clusters can be grown based on a threshold average edge weight. Initially, any seed clusters with an average edge weight below the threshold average edge weight can be discarded. For each remaining seed clusters, additional nodes (e.g., in accordance with descending edge weights) may be added to the seed cluster and the average edge weight for the expanded seed cluster may be determined. If the average edge weight is above the threshold average edge weight, another additional node may be added and the average edge weight for the expanded seed cluster may again be determined. This may be iteratively performed until it is determined that the addition of another node would result in an average edge weight that is below the threshold average edge weight, and the seed cluster is not grown any further.

After growing the one or more seed clusters, the grown seed clusters may be processed to determine overlapping seed clusters to identify seed clusters with substantial overlap. For example, seed clusters that may have been grown from nearby nodes may have substantial overlap and may be considered duplicative. Accordingly, seed clusters that are determined to substantially overlap may be identified and removed. According to exemplary embodiments of the present disclosure, quality scores may be determined for the seed clusters, and substantially overlapping grown seed clusters may be identified based on similarity scores between the grown seed clusters (e.g., a Jaccard similarity index, etc.) and seed clusters having a similarity score to another grown seed cluster that exceeds a similarity threshold may be identified as being substantially duplicative and may be discarded in accordance with their associated quality scores. Identification and determination of substantially overlapping grown seed clusters is described in further detail herein at least in connection with FIG. 4. After substantially overlapping grown seed clusters are determined and discarded, the remaining grown seed clusters may be provided as topics. Accordingly, each topic may comprise a set of tokens which make up remaining grown seed cluster. According to exemplary embodiments of the present disclosure, the topics can be associated with nodes of a taxonomy in the creation of the taxonomy.

Figure 7:
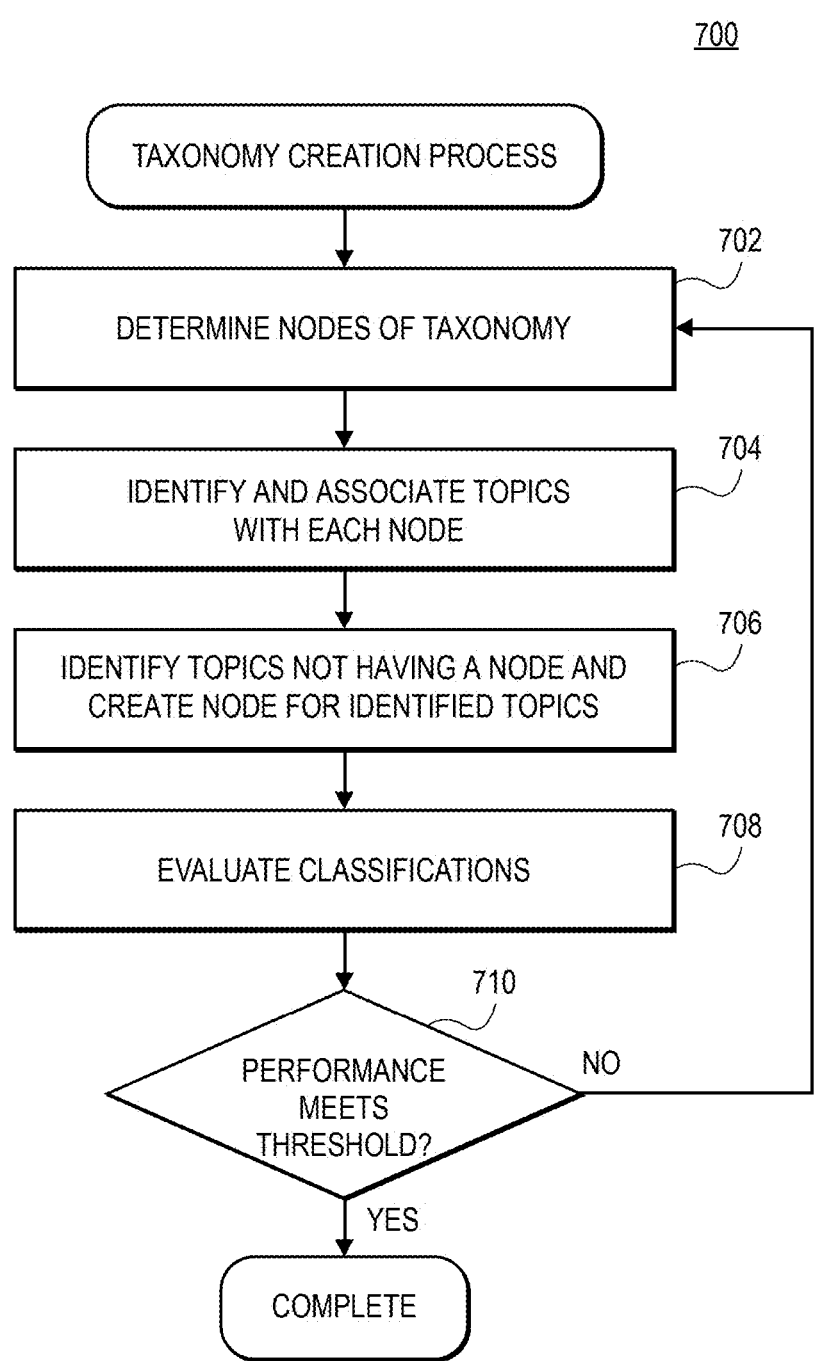
FIG. 7 is a flow diagram of an exemplary taxonomy creation process, according to exemplary embodiments of the present disclosure.

FIG. 7 is a flow diagram of an exemplary taxonomy creation process 700, according to exemplary embodiments of the present disclosure. In exemplary implementations, topics and/or subtopics (e.g., determined by processes 200 and/or 500) may be used in the creation of a taxonomy.

As shown in FIG. 7, process 700 may begin by determining the nodes of the taxonomy to be created, as in step 702. Each node of the taxonomy may include a classification, interest, etc. associated with the taxonomy. According to certain aspects of the present disclosure, the nodes of the taxonomy may already be defined.

In step 704, topics may be identified for each defined node and associated with each corresponding node. For example, the topics may include topics and/or subtopics determined in accordance with exemplary embodiments of the present disclosure (e.g., using exemplary processes 200 and/or 500). After the topics and/or subtopics have been associated with each corresponding node, a performance of classifications performed by the taxonomy may be evaluated, as in step 706. For example, since exemplary implementations contemplate that content items may already include associations and/or mappings to queries, the nodes of the taxonomy (which are associated with one or more topics) can be transitively mapped to the content items, and the classification of the content items based on the mappings and the association of the topic and/or subtopic with each corresponding node can be determined.

In step 706, topics and/or subtopics determined in accordance with exemplary embodiments of the present disclosure (e.g., using exemplary processes 200 and/or 500) not having a node with which they may be associated can be identified. For example, topics and/or subtopics may be identified and determined in accordance with exemplary embodiments of the present disclosure (e.g., using exemplary processes 200 and/or 500) but are not readily associable to a node of the taxonomy determined in 702 (or in an already-existing taxonomy). Accordingly, based on the topic and/or subtopic, one or more nodes of the taxonomy can be determined and/or created for the taxonomy. This can result, for example, in a richer, more complete taxonomy.

At step 708, the results are evaluated and if the taxonomy meets a desired performance threshold (e.g., step 710), the process can complete. However, if the taxonomy does not meet the desired performance threshold, the process may return to step 702 so that nodes may be redefined and/or the topics may be re-determined and/or associated with each corresponding node.

Figure 8:
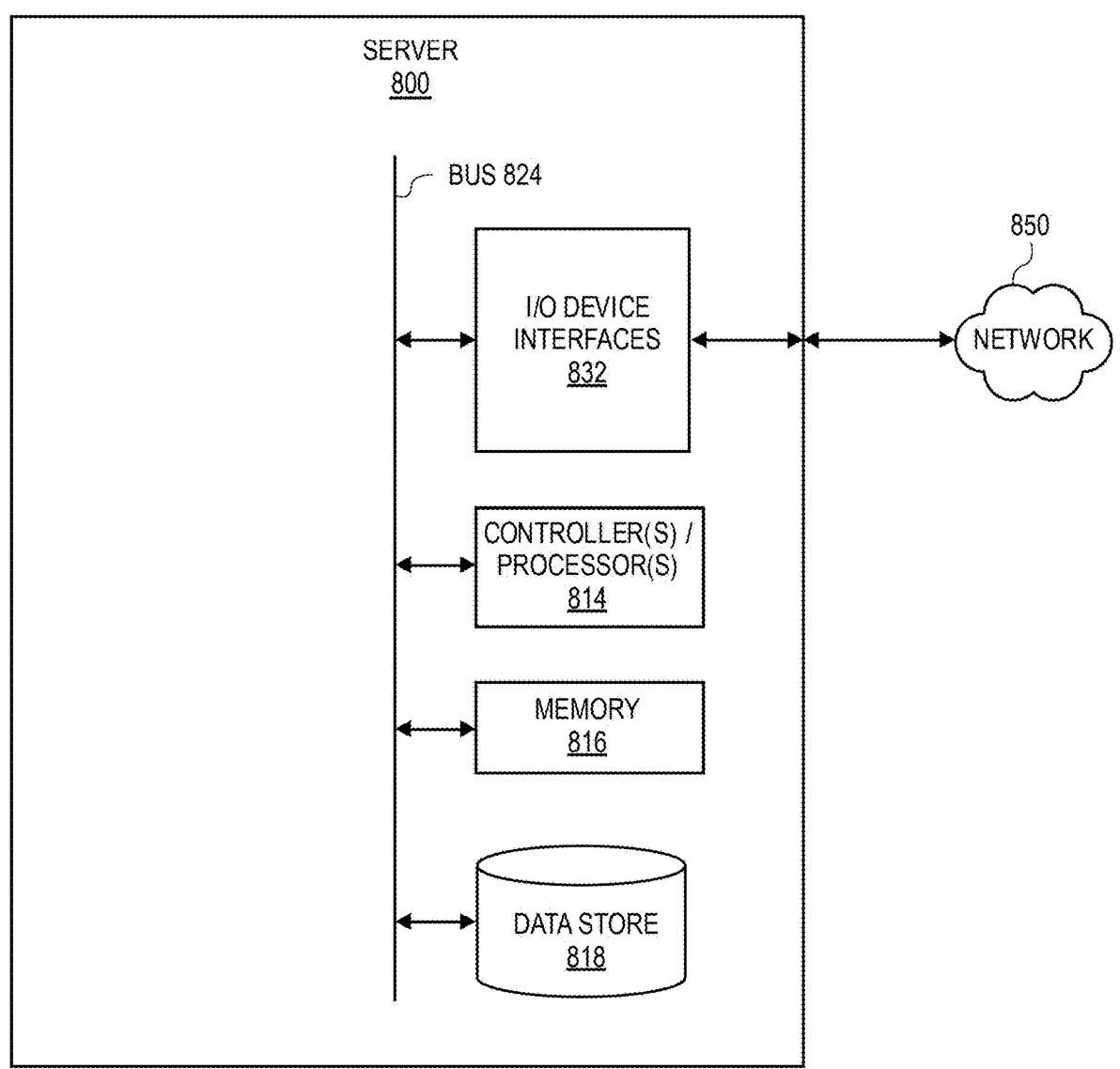
FIG. 8 is a block diagram an exemplary server, according to exemplary embodiments of the present disclosure.

FIG. 8 is a block diagram conceptually illustrating example components of an exemplary server 800 (e.g., on which online service 110 may execute), in accordance with described implementations. Multiple such servers 800 may be included in the system.

Each of server(s) 800 may include one or more controllers/processors 814, that may each include a central processing unit (CPU) for processing data and computer-readable instructions, and memory 816 for storing data and instructions. Memory 816 may individually include volatile random-access memory (RAM), non-volatile read only memory (ROM), non-volatile magnetoresistive random-access memory (MRAM) and/or other types of memory. Each server may also include a data storage component 818, for storing data, controller/processor-executable instructions, training data, labels, etc. Each data storage component may individually include one or more non-volatile storage types such as magnetic storage, optical storage, solid-state storage, etc. Each server 800 may also be connected to removable or external non-volatile memory and/or storage (such as a removable memory card, memory key drive, networked storage, etc.), internal, and/or external networks 850 (e.g., the Internet) through respective input/output device interfaces 832.

Computer instructions for operating each server 800 and its various components may be executed by the respective server's controller(s)/processor(s) 814, using the memory 816 as temporary "working" storage at runtime. Server 800's computer instructions may be stored in a non-transitory manner in non-volatile memory 816, storage 818, and/or an external device(s). Alternatively, some or all of the executable instructions may be embedded in hardware or firmware on the respective device in addition to, or instead of software.

Each server 800 includes input/output device interfaces 832. A variety of components may be connected through the input/output device interfaces 832. Additionally, each server 800 may include address/data bus 824 for conveying data among components of the respective server. Each component within server 800 may also be directly connected to other components in addition to (or instead of) being connected to other components across bus 824.

The components of the server(s) 800, as illustrated in FIG. 8, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 2-5 and 7, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Aspects of the disclosed system may be implemented as a computer method or as an article of manufacture, such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

The elements of a method, process, or algorithm described in connection with the implementations disclosed herein can also be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed:

1. A computing system, comprising:
one or more processors;
a memory storing program instructions that, when executed by the one or more processors, cause the one or more processors to at least:
for one or more query sessions of a plurality of query sessions:
determine, by an online service executing on the computing system, a plurality of tokens included in the query session based on specified frequency of occurrence of n-grams in queries of the query session; and
associate, by the online service, the plurality of tokens to corresponding queries included in the query session;
aggregate, by the online service, the plurality of tokens across the plurality of query sessions to associate the plurality of tokens determined from the plurality of query sessions to corresponding queries across the plurality of query sessions;
determine token-query association strengths between the tokens of the aggregated plurality of tokens and queries, wherein the association strength corresponds to a co-occurrence of one or more tokens of the plurality of tokens with a corresponding number of query sessions in which the token and corresponding query session appear;
generate a weighted token graph using the token-query association strengths;
cluster, by the online service and based at least in part on weighted token graph, the plurality of tokens into a plurality of clusters;
associate, by the online service, the plurality of clusters with a plurality of nodes of a taxonomy as a plurality of topics, wherein the taxonomy is configured to maintain a corpus of content items by the online service;
determine, in response to a request for content items and based at least in part on the taxonomy, a content item from the corpus of content items; and
cause, by the online service, the content item to be presented on a client device associated with the request for content items.

2. The computing system of claim 1, wherein:
associating the plurality of tokens to corresponding queries included in the query session includes generating a token-query bi-graph;
aggregating the plurality of tokens across the plurality of query sessions to associate the plurality of tokens determined from the plurality of query sessions to corresponding queries across the plurality of query sessions includes generating a weighted aggregated token-query bi-graph; and
the weighted aggregated token-query bi-graph includes a plurality of weighted associations between the plurality of tokens across the plurality of query sessions and the corresponding queries across the plurality of query sessions.

3. The computing system of claim 2, wherein the program instructions that, when executed by the one or more processors, further cause the one or more processors to at least:

generate the weighted token graph based at least in part on the plurality of weighted associations of the weighted aggregated token-query bi-graph.

4. The computing system of claim 2, wherein the plurality of weighted associations are independent of a first size of the plurality of tokens across the plurality of query sessions and a second size of the plurality of query sessions.

5. The computing system of claim 1, wherein the program instructions that, when executed by the one or more processors, further cause the one or more processors to at least:

determine a second plurality of queries associated with the plurality of clusters;

determine a plurality of digital content items from the corpus of digital content items associated with the second plurality of queries;

generate, based at least in part on the plurality of digital content items and the second plurality of queries, a weighted query graph including a plurality of query nodes representing the second plurality of queries and a plurality of edges representing similarities between the second plurality of queries of the plurality of query nodes; and determine, based at least in part on the weighted query graph, a query cluster including a third plurality of clusters as a plurality of subtopics.

6. The computing system of claim 1, wherein a first query session from the plurality of query sessions relates to at least one of:

a nuanced query topic;

a non-compositional query topic; or a query topic relating to a plurality of domains.

7. A computer-implemented method, comprising:

processing, by an online service, a plurality of queries to determine a first plurality of tokens from a plurality of n-grams appearing in the plurality of queries;

determining token-query association strengths between the first plurality of tokens and the plurality of queries, wherein the association strength corresponds to a co-occurrence of one or more tokens of the first plurality of tokens with a corresponding number of queries in which the token and corresponding query appear;

generating, by the online service and based at least in part on the token-query association strengths, a weighted token graph, wherein the weighted token graph includes:

a second plurality of tokens of the first plurality of tokens; and a plurality of edges associating the second plurality of tokens based on similarities between the second plurality of tokens;

determining, by the online service and based at least in part on the weighted token graph, a cluster within the weighted token graph as a topic;

associating, by the online service, the topic with a node of a taxonomy maintained by the online service and configured to maintain a corpus of digital content items by the online service; and causing, by the online service and in response to a request for digital content items, a first digital content item of the corpus of digital content items that is responsive to the request to be presented on a client device accessing the online service, wherein the first digital content item is identified from the corpus of digital content items based at least in part on the taxonomy.

8. The computer-implemented method of claim 7, further comprising:

determining a second plurality of queries associated with the cluster;

determining a plurality of digital content items from the corpus of digital content items associated with the second plurality of queries;

generating, based at least in part on the plurality of digital content items and the second plurality of queries, a weighted query graph including a plurality of query nodes representing the second plurality of queries and a plurality of edges representing similarities between the second plurality of queries of the plurality of query nodes; and determining, based at least in part on the weighted query graph, a query cluster including a third plurality of clusters as a plurality of subtopics.

9. The computer-implemented method of claim 7, wherein:

generating the weighted token graph includes generating a weighted token-query bi-graph that includes weighted associations between the plurality of tokens and the plurality of queries; and the weighted token graph is generated based at least in part on the weighted token-query bi-graph.

10. The computer-implemented method of claim 9, wherein the weighted associations represent a co-occurrence of the plurality of tokens and the plurality of queries.

11. The computer-implemented method of claim 9, wherein the weighted associations are independent of a first number of the plurality of tokens and a second number of the plurality of queries.

12. The computer-implemented method of claim 9, wherein generating the weighted token graph includes:

determining a plurality of similarity scores for groups of queries associated with tokens included in the weighted token-query bi-graph; and assigning the plurality of similarity scores as edge weights in the weighted token graph.

13. The computer-implemented method of claim 9, wherein:

determining the cluster includes:

determining, based at least in part on the weighted token graph, a plurality of seed clusters, each of the plurality of seed clusters including a plurality of tokens; and iteratively expanding at least one of the plurality of seed clusters based at least in part on edge weights of the weighted token graph connecting token nodes to neighboring token nodes to include at least on additional token; and the cluster is one of the plurality of seed clusters.

14. The computer-implemented method of claim 13, wherein determining the cluster further includes:

determining the cluster includes:

determining, based at least in part on the weighted token graph, a plurality of expanded seed clusters; and discarding at least one expanded seed cluster from the plurality of expanded seed clusters based at least in part on at least one of an overlap of the at least one expanded seed cluster with other expanded seed clusters of the plurality of expanded seed clusters or a ranking of the plurality of expanded seed clusters to generate a reduced plurality of expanded seed clusters; and the cluster is one of the reduced plurality of expanded seed clusters.

15. The computer-implemented method of claim 7, wherein the plurality of queries includes at least one of:

a nuanced query;

a non-compositional query; or a query relating to a plurality of domains.

16. The computer-implemented method of claim 7, wherein the plurality of queries include queries across a plurality of query sessions.

17. A method, comprising:

determining, by an online service executing on a computing system, a first plurality of tokens associated with a first plurality of queries associated with a first query session;

associating, by the online service, the first plurality of tokens with the first plurality of queries;

determining, by the online service, a second plurality of tokens associated with a second plurality of queries associated with a second query session;

associating, by the online service, the second plurality of tokens with the second plurality of queries;

aggregating, by the online service, the associations of the first plurality of tokens with the first plurality of queries and the associations of the second plurality of tokens with the second plurality of queries to generate an aggregation of associations, wherein the aggregation of associations includes associations of tokens included in the first plurality of tokens and the second plurality of tokens to queries included in the first plurality of queries and the second plurality of queries;

determining token-query association strengths between the first plurality of tokens and the first plurality of queries and the second plurality of tokens and the second plurality of queries, wherein the association strength corresponds to a co-occurrence of one or more tokens of the first plurality of tokens with a corresponding number of queries of the first plurality of queries in which the token and corresponding query appear or a co-occurrence of one or more tokens of the second plurality of tokens with a corresponding number of queries of the second plurality of queries in which the token and corresponding query appear;

determining, based at least in part on the token-query association strengths and by the online service, a plurality of clusters of tokens as a plurality of topics;

associating the plurality of topics with a plurality of nodes of a taxonomy configured to maintain a corpus of digital content items;

determining, in response to a request for content items and based at least in part on the taxonomy, a first digital content item from the corpus of digital content items that is responsive to the request; and causing the first digital content item to be presented on a user device from which the request was received.

18. The method of claim 17, wherein:

aggregating the associations of the first plurality of tokens with the first plurality of queries and the associations of the second plurality of tokens with the second plurality of queries to generate the aggregation of associations includes generating a weighted token-query bi-graph that includes weighted associations between the plurality of tokens and the plurality of queries; and determining the plurality of clusters of tokens includes generating a weighted token graph based at least in part on the weighted associations of the weighted token-query bi-graph.

19. The method of claim 18, wherein the weighted associations are independent of a first number of tokens included in the first plurality of tokens and the second plurality of tokens and a second number of queries included in the first plurality of queries and the second plurality of queries.

20. The method of claim 17, wherein the first plurality of queries and the second plurality of queries include at least one of:

a nuanced query;

a non-compositional query; or a query relating to a plurality of domains.

\* \* \* \* \*